United States Patent [19]
Ueno et al.

[11] Patent Number: 5,867,045
[45] Date of Patent: Feb. 2, 1999

[54] SIGNAL PROCESSOR COMPRISING MEANS FOR HOLDING OUTPUT SIGNALS OF IMAGE SENSORS AND MEANS FOR MIXING THE HELD SIGNALS

[75] Inventors: Isamu Ueno, Hadano; Mamoru Miyawaki, Isehara; Tetsunobu Kohchi, Hiratsuka, all of Japan

[73] Assignee: Canon Kabushiki Kaisha, Tokyo, Japan

[21] Appl. No.: 744,838

[22] Filed: Nov. 19, 1996

Related U.S. Application Data

[63] Continuation of Ser. No. 209,884, Mar. 14, 1994, abandoned.

[30] Foreign Application Priority Data

Mar. 15, 1993 [JP] Japan .................................. 5-053894
Apr. 22, 1993 [JP] Japan .................................. 5-095988

[51] Int. Cl.$^6$ .................................................. G11C 27/02
[52] U.S. Cl. .............................. 327/94; 327/91; 327/106; 327/407; 327/515; 250/208.1
[58] Field of Search ................................. 307/311, 529, 307/352, 353; 328/151, 156; 250/208.1; 327/355, 361, 105, 106, 403, 405, 407, 404, 514, 515, 94, 91

[56] References Cited

U.S. PATENT DOCUMENTS

| | | | |
|---|---|---|---|
| 4,001,605 | 1/1977 | Thomas et al. | 327/535 |
| 4,189,749 | 2/1980 | Hiroshima et al. | 307/311 |
| 4,511,847 | 4/1985 | Rantala | 307/529 |
| 4,616,142 | 10/1986 | Upadhyay et al. | 327/405 |
| 4,678,938 | 7/1987 | Nakamura | 307/311 |
| 4,791,469 | 12/1988 | Ohmi et al. | 357/30 |
| 4,810,896 | 3/1989 | Tanaka et al. | 250/578 |
| 4,996,413 | 2/1991 | McDaniel et al. | 250/208.1 |
| 5,019,702 | 5/1991 | Ohzu et al. | 250/208.1 |
| 5,120,991 | 6/1992 | Takahashi | 327/403 |
| 5,227,619 | 7/1993 | Vilaire et al. | 250/206.2 |
| 5,353,383 | 10/1994 | Uchimura et al. | 327/355 |

FOREIGN PATENT DOCUMENTS

| | | |
|---|---|---|
| 0499320A1 | 8/1992 | European Pat. Off. . |
| 2598019 | 10/1987 | France . |
| 4123203 | 10/1992 | Germany . |

OTHER PUBLICATIONS

Pat. Abs. Jp., vol. 16, No. 158 (E–1191), Apr. 17, 1992.

*Primary Examiner*—Timothy P. Callahan
*Assistant Examiner*—Jung Ho Kim
*Attorney, Agent, or Firm*—Fitzpatrick, Cella, Harper & Scinto

[57] ABSTRACT

A signal processor with a simplified circuit configuration provides an improved processing speed and can be realized of small size and at inexpensive cost. The signal processor includes signal holding means for holding output signals from plural signal sources (S1–S4), and signal mixing means (M31–M34) for mixing at least two signals among the plural signals held to output plural mixed signals. Since the mixed signals are less than the signal sources in number, the small number of signal lines can lead to an increased processing speed. Then the mixed signals corresponding to discrete signals from plural signal sources enables processing without substantially destroying information.

12 Claims, 29 Drawing Sheets

SIGNAL PROCESSOR COMPRISING MEANS FOR HOLDING OUTPUT SIGNALS OF IMAGE SENSORS AND MEANS FOR MIXING THE HELD SIGNALS

This application is a continuation of application Ser. No. 08/209,884 filed Mar. 14, 1994 now abandoned.

BACKGROUND OF THE INVENTION

1. Field of the Invention

The present invention relates to a signal processor for processing plural signals and used for information storage devices, photoelectric converters, and the like.

2. Related Background Art

In image sensors and semiconductor memory devices, typically, read-only memories (ROMs), a X-Y address system configuration is employed, where a shift register performs a vertical scanning operation and a horizontal scanning operation to output sequentially chronological externally output signals from signal sources such as memory cells and photo cells.

An explanation will be given for an example of the conventional signal processor. FIG. 1 is a circuit diagram showing the conventional signal processor. FIG. 2 is a drive timing chart for the conventional signal processor.

Referring now to FIG. 1, signal sources S1, S2, S3, and S4 are typical photo cells each for outputting a voltage. The photo signals are chronologically outputted to the output line 5 via N-type MOS transistors M11, M12, ... M14, M21, M22 ... M24 acting as switching elements, and capacitance elements C11, C12 ... C14 acting as signal holding means.

First, when a pulse applied to the terminal 1 rises up at the time $t_0$, the photo signals for the cells M11 to M14 are read out and held in the capacitance elements C11 to C14, respectively. Then when the pulse applied to the terminal 1 falls down, the scanning circuit 11 starts to operate. A selection pulse is outputted to the signal line L1 at the time $t_2$. At this time; the signal held in the capacitance element C11 is outputted to the terminal 12 via the signal line 5 and the output amplifier 10.

Then when the pulse on the signal line L1 falls down and the reset pulse is applied to the terminal 2 at the time $t_4$, the output line 5 is reset to the reset reference potential of the terminal 3.

Similarly, the output operation and the reset operation are repeated for the remaining signal sources S2 to S4. The signals which are read out in parallel from the signal sources S1 to S4 and then held in the capacitance elements C11 to C14 are converted into time series signals.

In an actual signal processor, the signal sources are over 100 in number, and recently has become over 100 thousand in number.

Hence even if the reading time per signal source is short, there are limitations in reducing the time necessary to output signals from all signal sources as time series signals.

On the other hand, in many cases, when photo cells are used as the signal sources, the signals from the signal sources are outputted as visible images. For such images, the case may occur where a bright signal occupies only a very small region in one frame and a dark signal occupies the remaining region thereof, as when a match flames in the dark.

In such a case, the conventional signal processor performs necessary image signal processing by outputting all cell signals chronologically and then storing them in an external random access memory.

Hence the conventional processor is sufficient for general purpose devices. However, the processing rate cannot be improved because access to all cells causes unnecessary signal outputting time when a process is performed using only a partial signal.

This technical problem applies not only to the photo cells but also to sequential signal outputting devices.

SUMMARY OF THE INVENTION

In order to overcome the above mentioned technical problems, the object of the present invention is to provide a signal processor which can provide an improved processing speed.

Another object of the present invention is to provide a small signal processor which can perform signal processing with a relatively simplified circuit configuration and at an inexpensive cost.

Another object of the present invention is to provide a signal processor which can be integrated in a signal semiconductor chip which outputs a mixed signal and a discrete signal.

As the means (configuration) according to one embodiment to solve the above problem and to achieve the above objects, a signal processor is characterized by plural signal sources, plural signal holding means for holding output signals from the plural signal sources, and signal mixing means for mixing at least two discrete output signals among the output signals held by the plural signal holding means to output plural discrete mixed signals.

In the configuration according to another embodiment, a signal processor is characterized by at least four signal sources, plural signal holding means for holding output signals from the signal sources, signal mixing means for mixing at least two discrete signals among output signals held by the plural signal holding means to produce at least two mixed signals, and discrete signal outputting means for producing respectively the output signals from the plural signal sources.

According to this embodiment of the present invention fewer mixed signals than signal sources are obtained by mixing suitable discrete signals from many signal sources.

Hence the signal processing rate can be greatly improved because of the small number of discrete signals to be processed. The small number of discrete signals can reduce the scale of the peripheral circuits, thus widening the applicability to systems.

The mixed signals, which are representative of plural original discrete signals and include nondestructive information, are particularly effective when information is roughly processed.

According to another embodiment (configuration) to solve the above problem and to achieve the objects, the signal processor includes means for adding signals from plural signal sources including means for adding signals from the signal sources and converting to a current, and means for outputting a signal in accordance with an added current.

According to this embodiment of the present invention, fewer addition signals than signal sources are obtained by adding suitably discrete signals from many discrete signal sources.

Hence the signal processing rate can be greatly improved because of the small number of discrete signals to be processed. The small number of discrete signals reduces the scale of the peripheral circuits, thus widening the applicability to systems.

The addition signals, which are representative of plural original discrete signals and include nondestructive information, are particularly effective when information is roughly processed.

According to the embodiment of the present invention, a desired process is not performed by chronologically outputting all the output signals from many signal sources and then storing them in a memory. Rather, the output signals from plural signal sources in a pre-selected group (block) are mixed and then the mixed signals are outputted chronologically.

In a concrete example, 200 signal sources are divided to 10 blocks, one block including 20 signal sources. The signal mixing means is arranged for each block and mixes 20 discrete signals in each block to make 10 mixed signals in total. Hence in order to treat 10 mixed signals as representative signals of all the signal sources, the signal processing system in the final stage becomes small in scale such that only discrete events, or 1/20 of 200 discrete events, are treated.

Particularly, in the image sensors representative of line sensors and area sensors, the common image reading operation is established by specifying plural adjacent photo cells as signal sources to be mixed, although the resolution may be degraded compared with the no mixing case.

Hence the present invention is preferably employed in the case where an entire image trend is desired to be read at high speed rather than high resolution.

Furthermore, when it is desired that only a limited area within an image be read with high resolution after an entire image trend has been read based on a mixed signal, the signal mixing means can read a discrete signal from each cell within a necessary block by controllably stopping the operation of the signal mixing means after the mixed signal reading operation.

According to the embodiments of the present invention, passive elements such as capacitors and resistors and active elements such as diodes and transistors are used for the signal source. A photo cell such as a photoelectric element and a photoconductive element are particularly preferable as the signal source to produce an electrical signal including information. A nondestructive readout-type photo cell, which uses a field effect transistor and a static induction transistor with a charge accumulating gate and a bipolar transistor with a charge accumulating base (to be described), is more preferably used for the photo cell.

A capacitance element as well as a latch circuit are used as signal holding means according to the embodiments of the present invention. A sample and hold circuit including a capacitance element is used in concrete when an analog signal is treated.

In the signal mixing means according to the embodiments of the present invention, it is preferable to use a transistor and a charge coupled element as a switching element connecting plural capacitance elements. Adding means is used as the mixing means in the present embodiments.

The concrete embodiments according to the present invention will be described in detail below. The present invention should not be limited to those embodiments. According to the present invention, substitution of equivalents of the structural elements and modification of materials can be made within the scope in which the objects of the present invention can be achieved.

These and other objects of the present invention will become apparent from the following drawings and detailed description taken in connection with the drawings.

DETAILED DESCRIPTION OF THE PREFERRED EMBODIMENTS

The first embodiment according to the present invention will be explained briefly with reference to the circuit diagram shown in FIG. 3 and the timing chart shown in FIG. 4.

Figure 1:
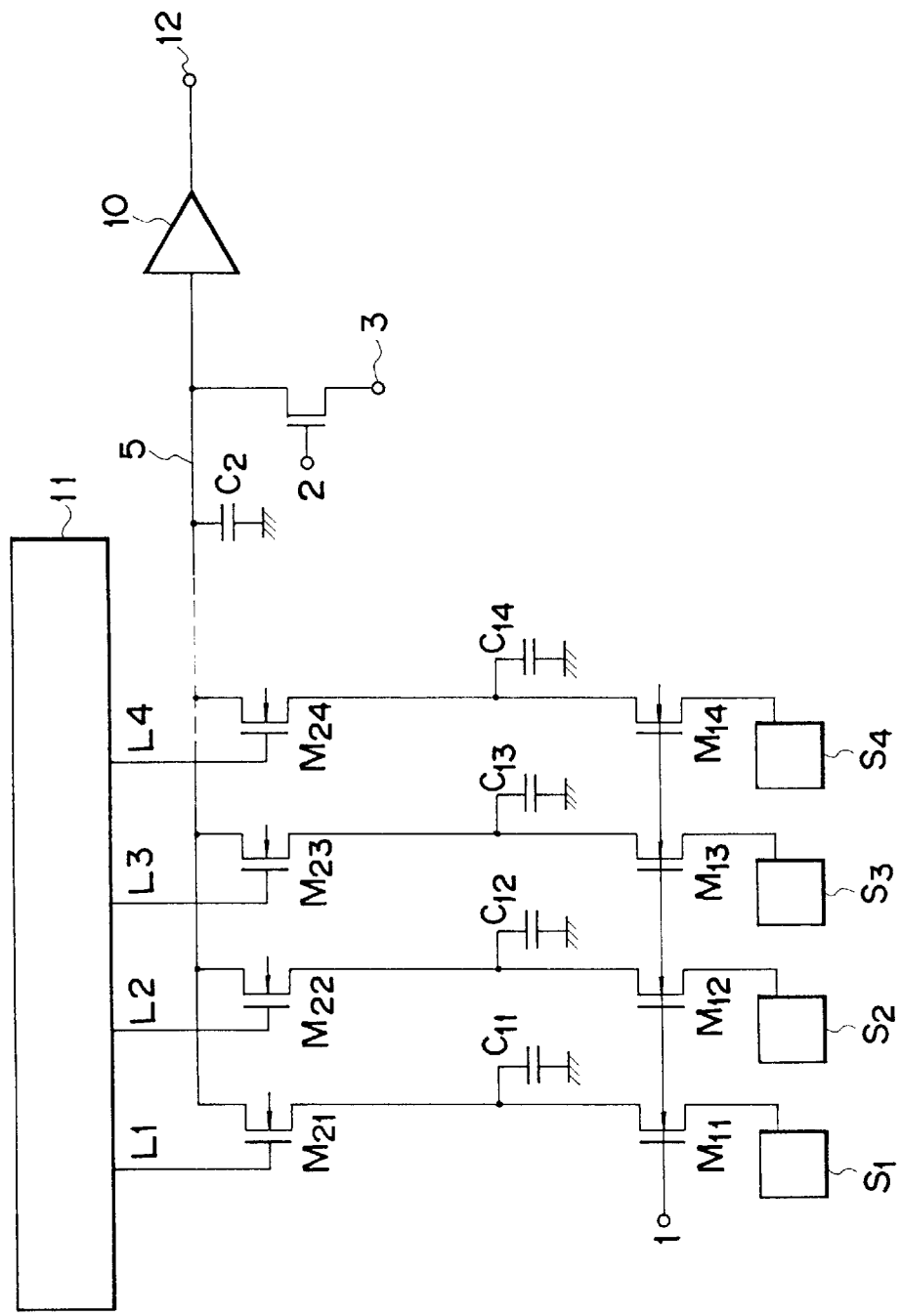
FIG. 1 is a circuit diagram for a conventional signal processor.
Figure 2:
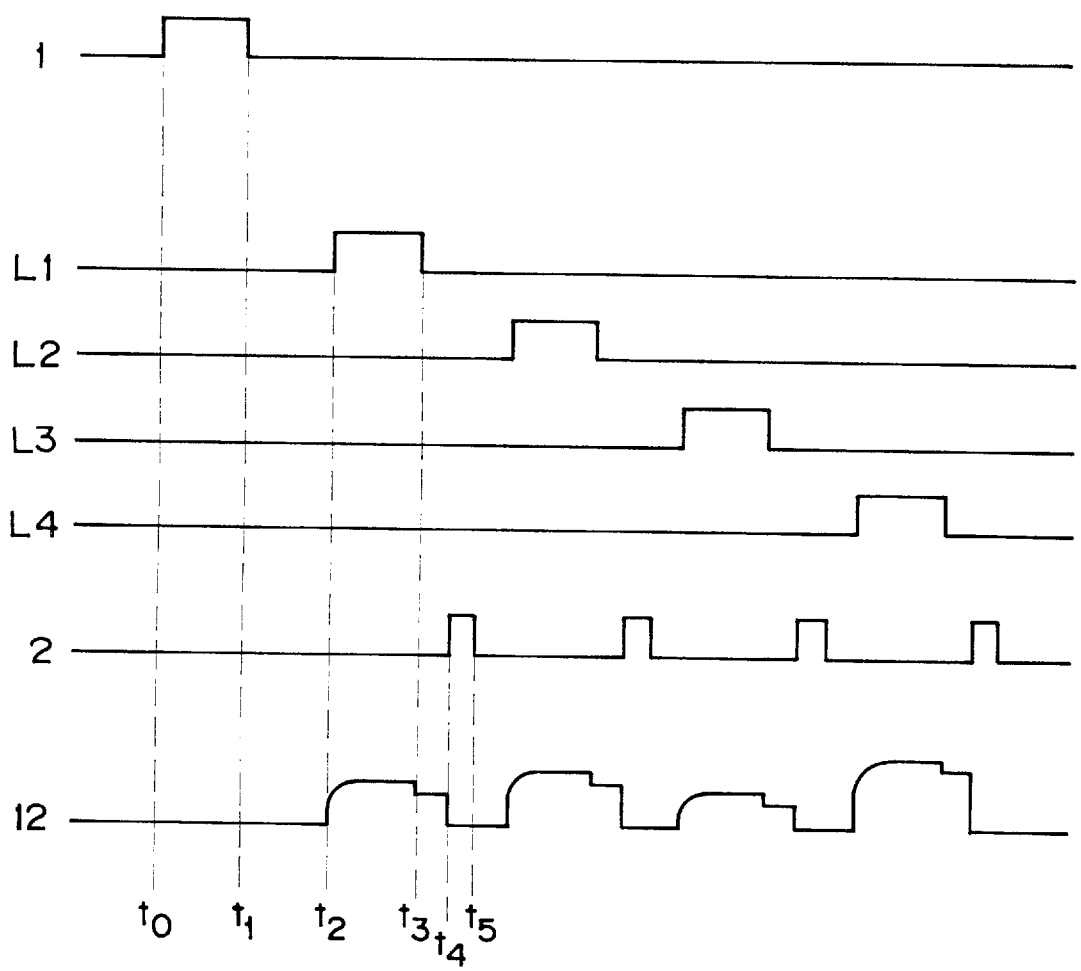
FIG. 2 is a drive timing chart for the conventional signal processor.
Figure 3:
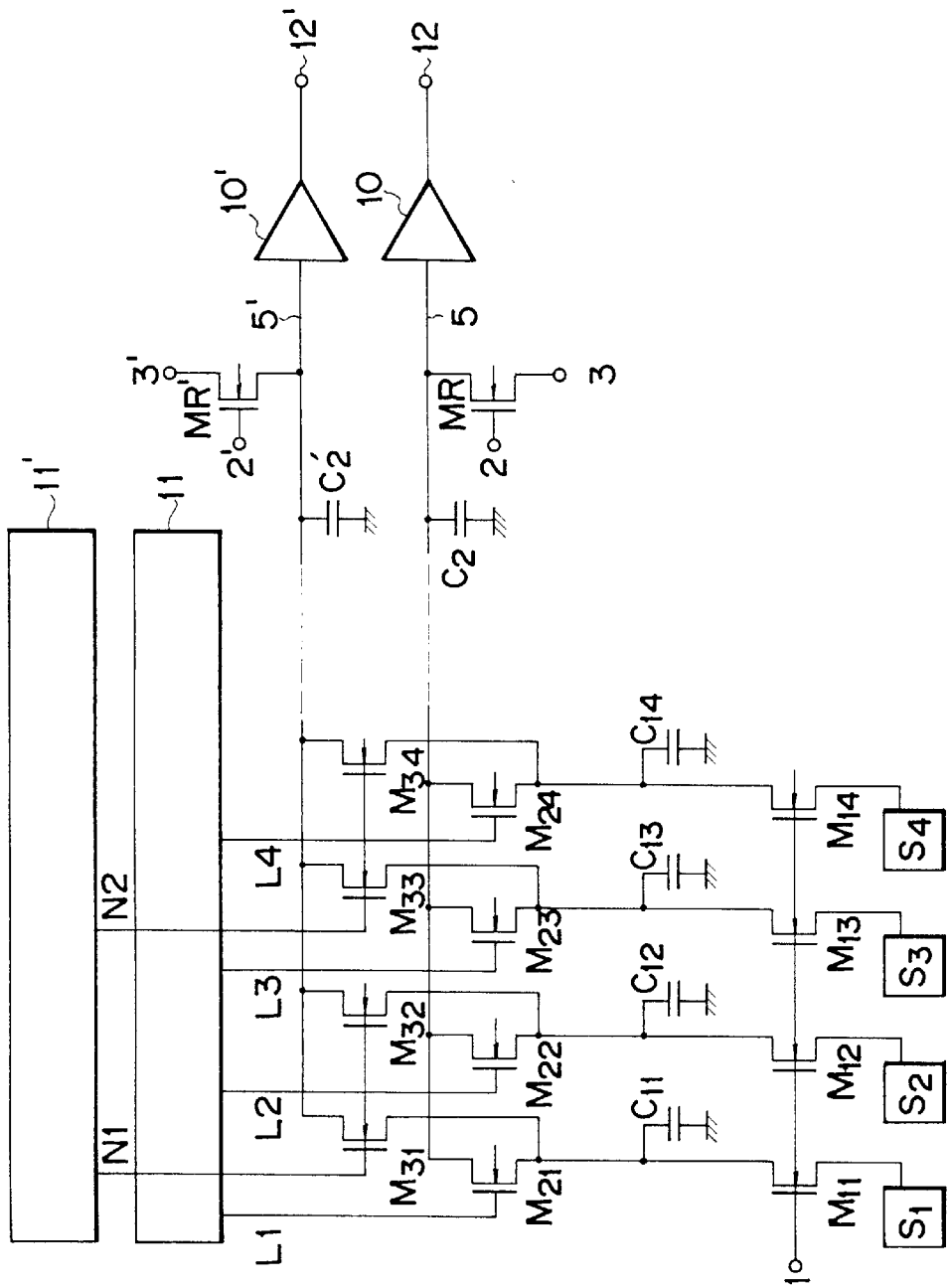
FIG. 3 is a circuit diagram for the signal processor according to the first embodiment of the present invention.
Figure 4:
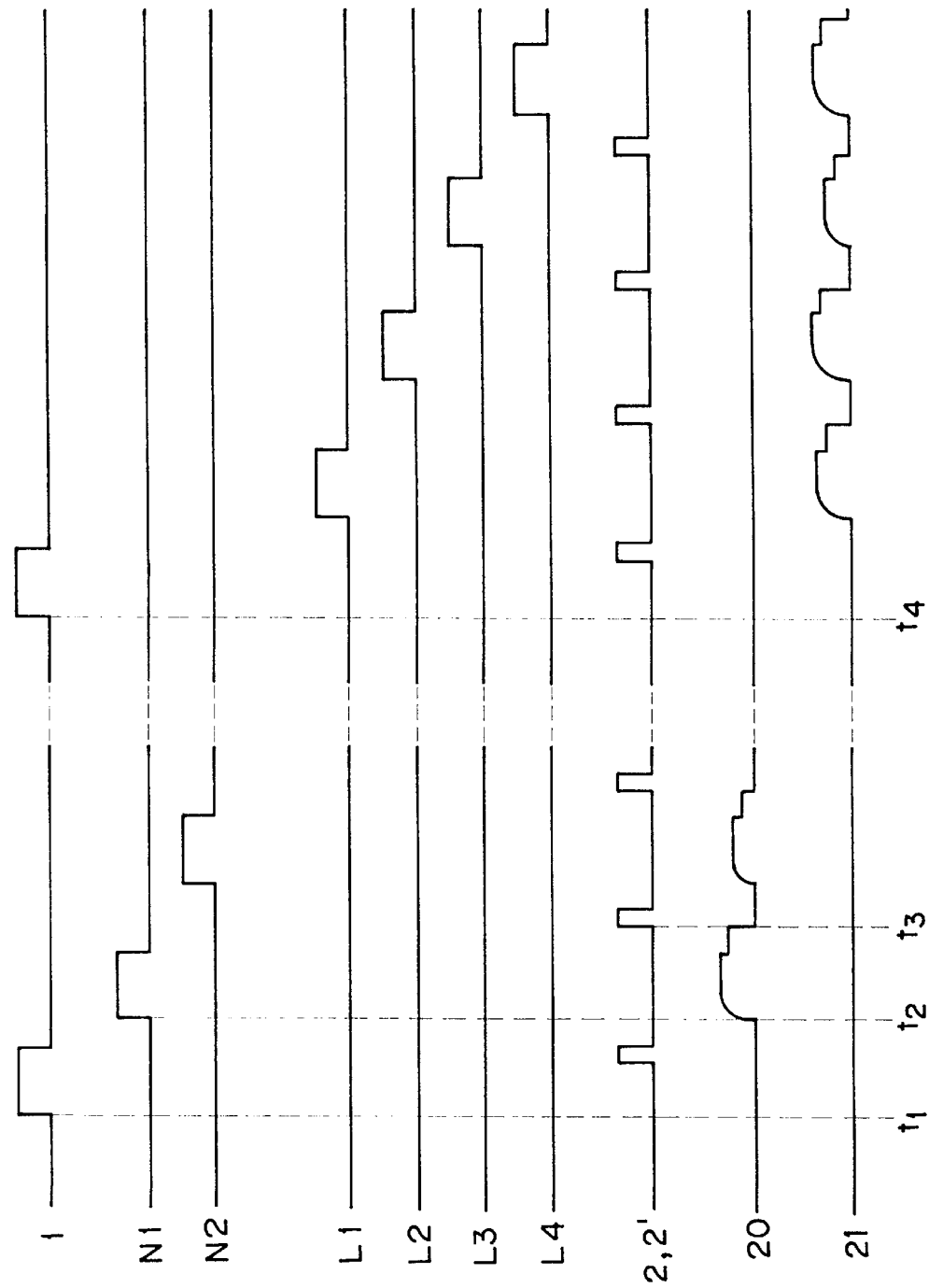
FIG. 4 is a drive timing chart for the signal processor according to the first embodiment of the present invention.

Referring to FIG. 3, according to the present invention, photo cells S1, S2, S3, and S4 are arranged one-dimensionally as signal sources to output an average signal in two pixel units.

The configuration is different from the conventional configuration in that a scanning circuit 11', MOS FETs M31, M32, M33, and M34 acting as switching elements, an output line 5', a capacitance element C2', and the like are arranged as the signal mixing means.

In other words, signals are chronologically processed in group (block) units including two cells. A reset MOS FET MR' is connected to the output line 5'. The reset MOS FET resets the potential of the capacitance element C2' associated with the output line 5' to the reference potential of the terminal 3' when a clock pulse is applied to the terminal 2'. Numeral 10' represents an amplifier similar to the amplifier 10. Numeral 12' represents an output terminal similar to the output terminal 12.

A signal reading pulse is applied to the terminal 1 at the time $t_1$. The photo signals from the cells S1, S2, S3, and S4 are simultaneously read to the capacitance elements C11, C12, C13, and C14.

When the scanning circuit 11' outputs the scanning pulse to the output line N1 at the time $t_2$, the two MOS transistors M31 and M32 are simultaneously turned on. Then the average signal of photo signals accumulated to the cells S1 and S2 is outputted to the terminal 12' via the capacitance element C2' and the amplifier 10'. Then when a reset pulse is applied to the terminal 2' at the time $t_3$, the transistor MR' is turned on while the output line 5' is reset. The block signal reading is completed by executing the above scanning operation for all blocks.

When the block signal has completely selected a necessary block, a pulse is again applied to the terminal 1. Then since the photo signals of the cells S1, S2, S3, and S4 are read to the capacitance elements C11, C12, C13, and C14 to drive the scanning circuit 11 at the time $t_4$, the photo signal of each cell is read chronologically in a cell unit.

If the scanning circuit 11' can start driving from an arbitrary cell and end driving to an arbitrary cell, only a signal for the necessary block need be read out.

If the cells S1, S2, S3, and S4 are nondestructively read out, photo signals can be read at substantially the same time as that for image information obtained through the block reading operation.

A bipolar transistor in which its emitter is connected to a capacitance load and photoelectrically produced charge is accumulated in a base, is desirable as the nondestructive read-out type sensor. The above bipolar transistor is disclosed, for example, in U.S. Pat. No. 4,791,469 which is entitled "Photoelectric Converter", invented by Tadahiro OHMI and Nobuyoshi TANAKA, and U.S. Pat. No. 4,810,896 which is entitled "Photoelectric Conversion Device with Reduced Fixed Pattern Noises", invented by Nobuyoshi TANAKA.

Figure 5:
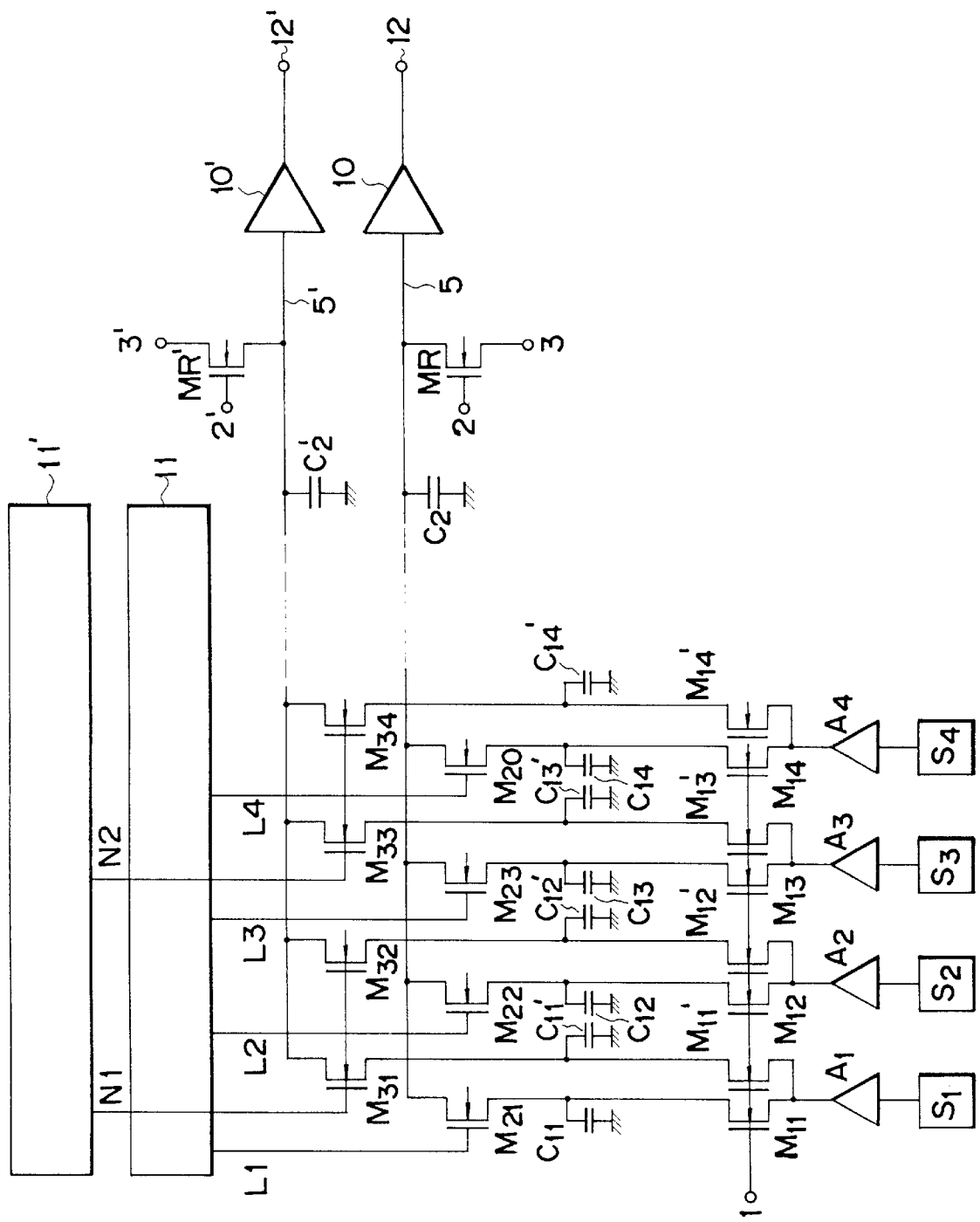
FIG. 5 is a circuit diagram for the signal processor according to the second embodiment of the present invention.

FIG. 5 is a circuit diagram showing the signal processor according to the second embodiment of the present invention. The signal processor is different from the first embodiment in that the output signal from a single source is held by two capacitance elements via an amplifier and two switches. Thus although the first embodiment requires two signal holding operations for the capacitance element, the second embodiment can complete the process with one signal holding operation.

In a brief explanation of the operation, when a pulse is applied to the terminal 1, the amplifiers A1 to A4 amplify signals for all cells S1 to S4 so that the amplified signals are simultaneously held in the capacitance elements C11 to C14 and C11' to C14'.

Next when the scanning circuit 11' turns on two MOS FETs M31 and M32, the capacitance C2' holds the average signal held in the two capacitance elements C11' and C12' and the amplifier 10' amplifies the average signal on the capacitance C2' to output it to the terminal 12'. Then after the reset MOS FET MR' has reset the potential of the output line 5', the average of the output signals held in the two capacitance elements C13' and C14' is outputted in response to the shift pulse $N_2$. This process is sequentially performed to output chronologically the average value for each block to the terminal 12'.

Thereafter, the scanning circuit 11 operates to output sequentially the signal from each cell. Thus the shift pulses are sequentially supplied to the output lines L1 to L4 so that the output signals for respective cells held in the capacitance elements C11 to C14 are sequentially chronologically outputted to the terminal 12.

According to the present embodiment, a nondestructive readout-type element can be used as a signal source.

The amplifiers A1 to A4 are used if necessary. If the signal source has a sufficiently low output impedance, the amplifiers can be omitted.

Figure 6:
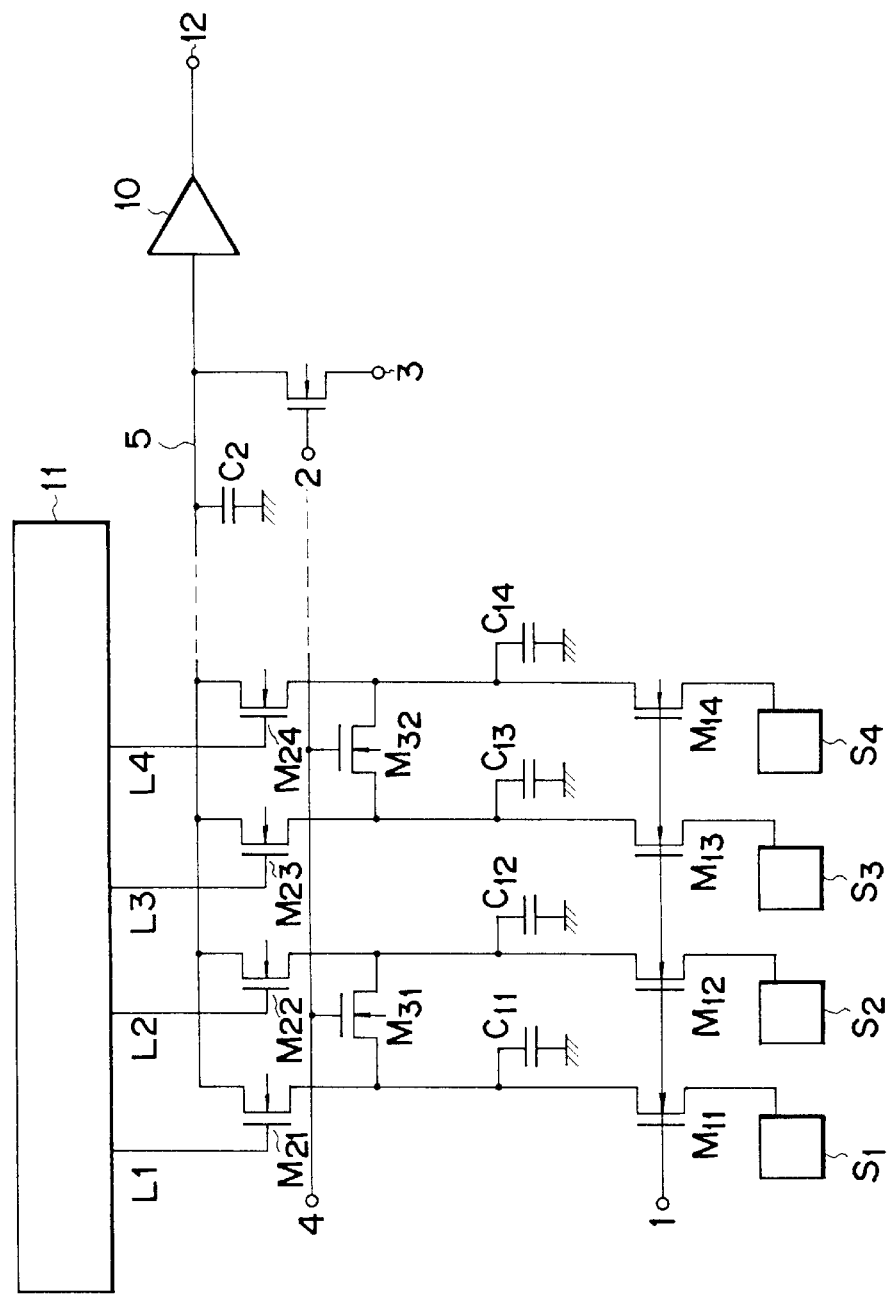
FIG. 6 is a circuit diagram for the signal processor according to the third embodiment of the present invention.
Figure 7:
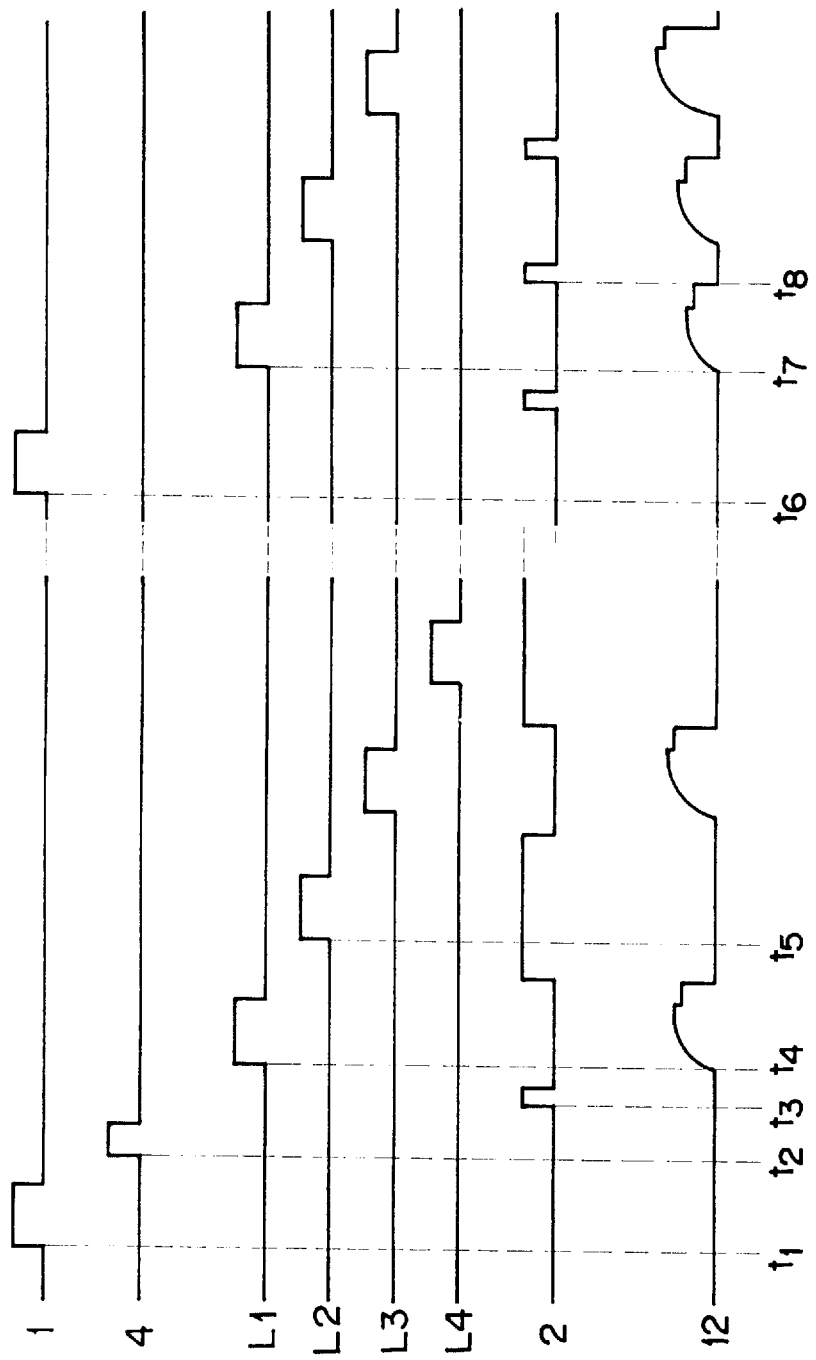
FIG. 7 is a drive timing chart for the signal processor according to the third embodiment.

FIG. 6 is a circuit diagram for the signal processor according to the third embodiment of the present invention. FIG. 7 is a drive timing chart for the signal processor according to the third embodiment of the present invention.

In the third embodiment, switching elements are arranged to commonly connect capacitance elements in a group to one another.

According to the present invention, there are two features including a single scanning circuit and a simplified driving method.

When a pulse is applied to the terminal 1 at the time $t_1$, the photo signals from the cells S1, S2, S3, and S4 are simultaneously read out to the capacitance elements C11, C12, C13, and C14.

Then when a pulse is applied to the terminal 4 at the time $t_2$, the MOS transistors M31, M32, M33, and M34 acting as switching elements are turned on. Since the capacitance elements C11 and C12 and the capacitance elements C13 and C14 are connected in common, the voltages are expressed as follows:

$$Vc11=Vc12=(C11V1+C12V2)/(C11+C12) \quad (1)$$

$$Vc13=Vc14=(C13V3+C14V4)/(C13+C14) \quad (2)$$

where V1, V2, V3, and V4 are signal voltages read to two capacitance elements C11 and C12, C13, and C14, respectively, and Vc12, Vc12, . . . are respectively the voltages after two capacitance elements are connected.

When a pulse from the scanning circuit is applied to the output line L1 at the time $t_4$, the MOS transistor M21 is turned on so that the signals on the two capacitance elements C11 and C12 are transferred to the output line 5. At this time, when the potential of the terminal 3, or a reset potential for the output line 5, is 0 volts, the voltage V0 on the output line 5 is expressed as follows:

$$V0=(C11+C12)Vc11/(C11+C12+C2) \quad (3)$$

Next, with the output line 5 at a reset potential, since the MOS transistor M22 corresponding to the output line L2 on which a pulse is applied is turned on, the signal of the capacitance element C12 is reset without being outputted. Thereafter, outputting the average value and resetting are repeated in the same way.

Since the pulses applied to the lines L2 and L4 have actually a very short pulse width, in comparison with the pulses for resetting the output lines L1 and L3, the scanning time for outputting the average value is very shorter than the entire cell scanning time.

Next, the signals for the cells S1 to S4 are held again by the capacitance elements C11 to C14 at the time $t_6$. Then with the pulse at a low level applied to the terminal 4, the MOS FETs M21 to M24 are sequentially turned on so that the signals held by the respective capacitance elements C11 to C14 appear sequentially and chronologically on the terminal 12.

Like the first and second embodiments, third embodiment employs a structure such that an amplifier is arranged at the output of the signal source and/or plural holding means are arranged for a single signal source. There are advantages in that the reading operation from the signal source to the holding means is completed at a single cycle and a destructive readout-type photoelectric conversion cell can be employed as a signal source.

Figure 8:
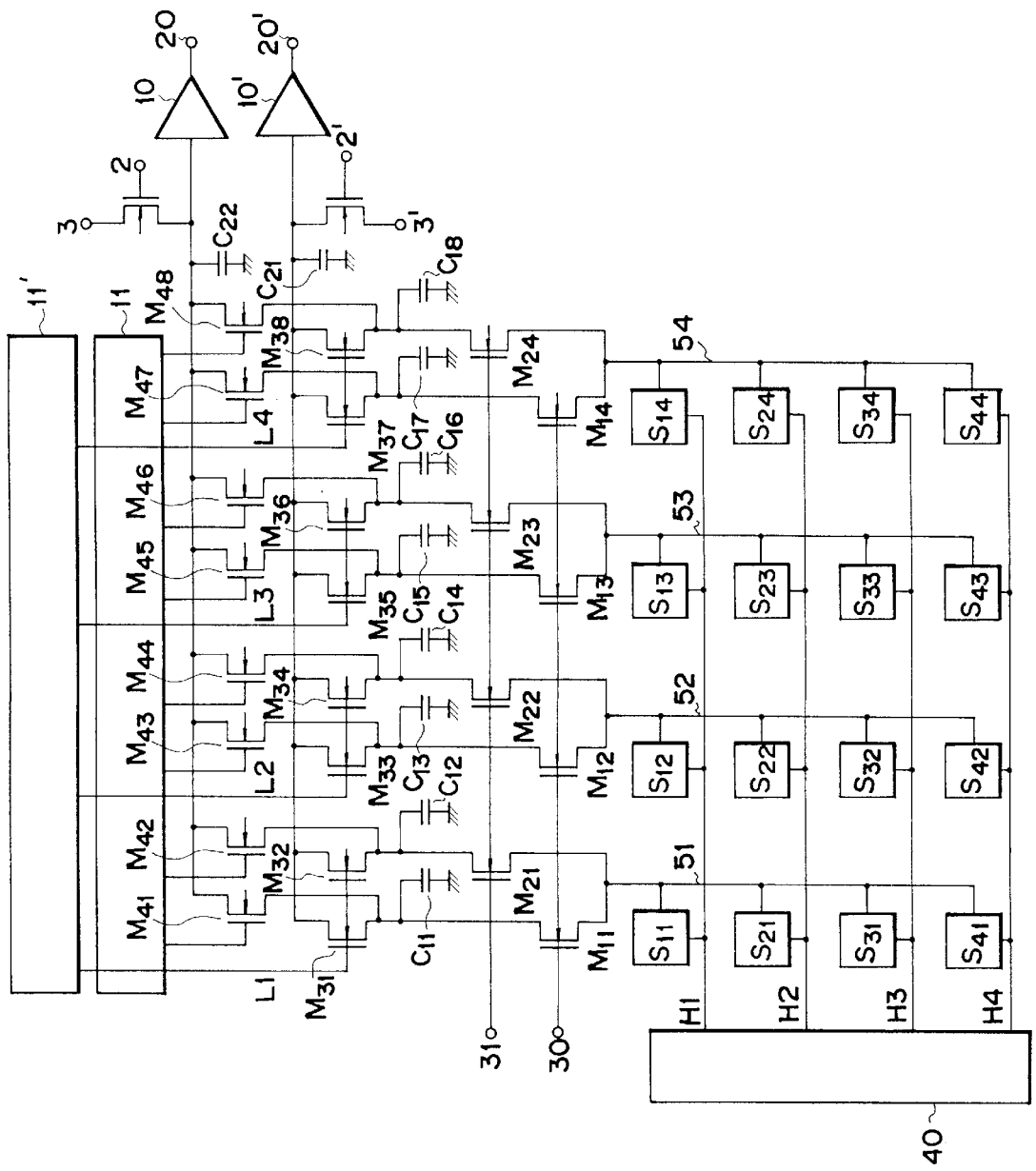
FIG. 8 is a circuit diagram for the signal processor according to the fourth embodiment of the present invention.

FIG. 8 shows a circuit diagram for the signal processor according to the fourth embodiment of the present invention.

According to the fourth embodiment, the structure of the first embodiment is applied to a two-dimensional sensor to output the average signal of the plural pixels (cells, for example, two pixels in the present embodiment) in vertical direction.

Figure 9:
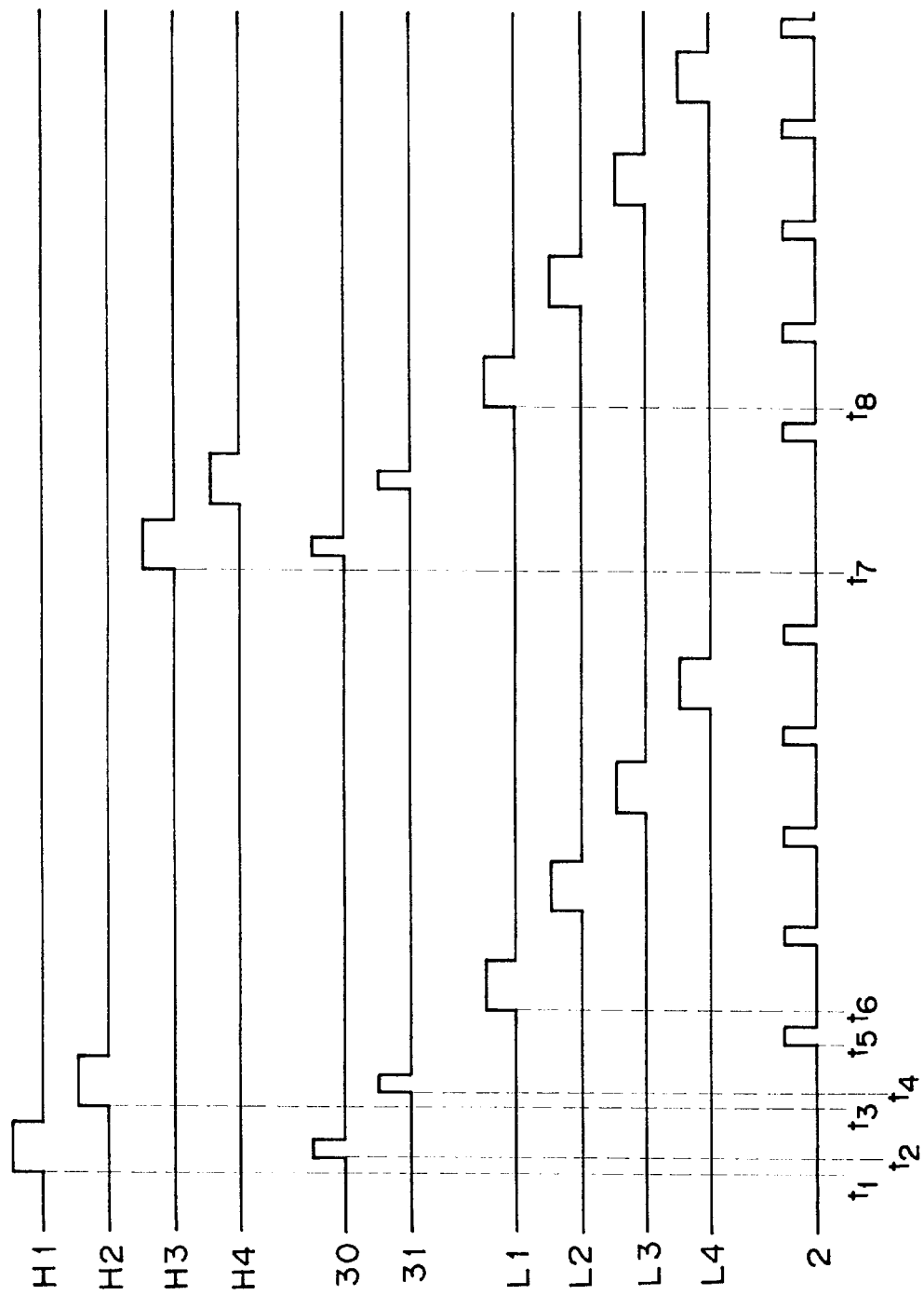
FIG. 9 is a drive timing chart for the signal processor according to the fourth embodiment of the present invention.

An explanation will be made below of the operation of the present embodiment with reference to the timing chart shown in FIG. 9.

A pulse is applied from the vertical scanning circuit 40 to the drive selection line H1 at the time $t_1$. Photo signals from the cells S11, S12, S13, and S14 for one column line are read out to the vertical lines 51, 52, 53, and 54 at the time $t_1$, respectively. When the pulse is applied to the terminal 30 at the time $t_2$, the MOS transistors M11, M12, M13, and M14 are turned on, whereby the photo signals are held in the capacitance elements C11, C13, C15, and C17.

Then the signals S21, S22, S23, and S24 on the column line are read out to the capacitance elements C12, C14, C16, and C18 at the time $t_3$, respectively.

Then, the horizontal scanning circuit 11' outputs sequential pulses to the output lines L1, L2, L3, and L4 so that the average signal of a pair of photo signals stored in the capacitance elements C11, C12, C13, C14, C15, C16, C17 and C18 is outputted to the terminal 20., As described above, after the average signals of the adjacent cells arranged in line on the two drive selection lines are outputted sequentially and chronologically, the following two drive selection lines H3 and H4 are selected to output sequentially and chronologically the average signal of the adjacent cells arranged in the direction of two column lines.

Figure 10:
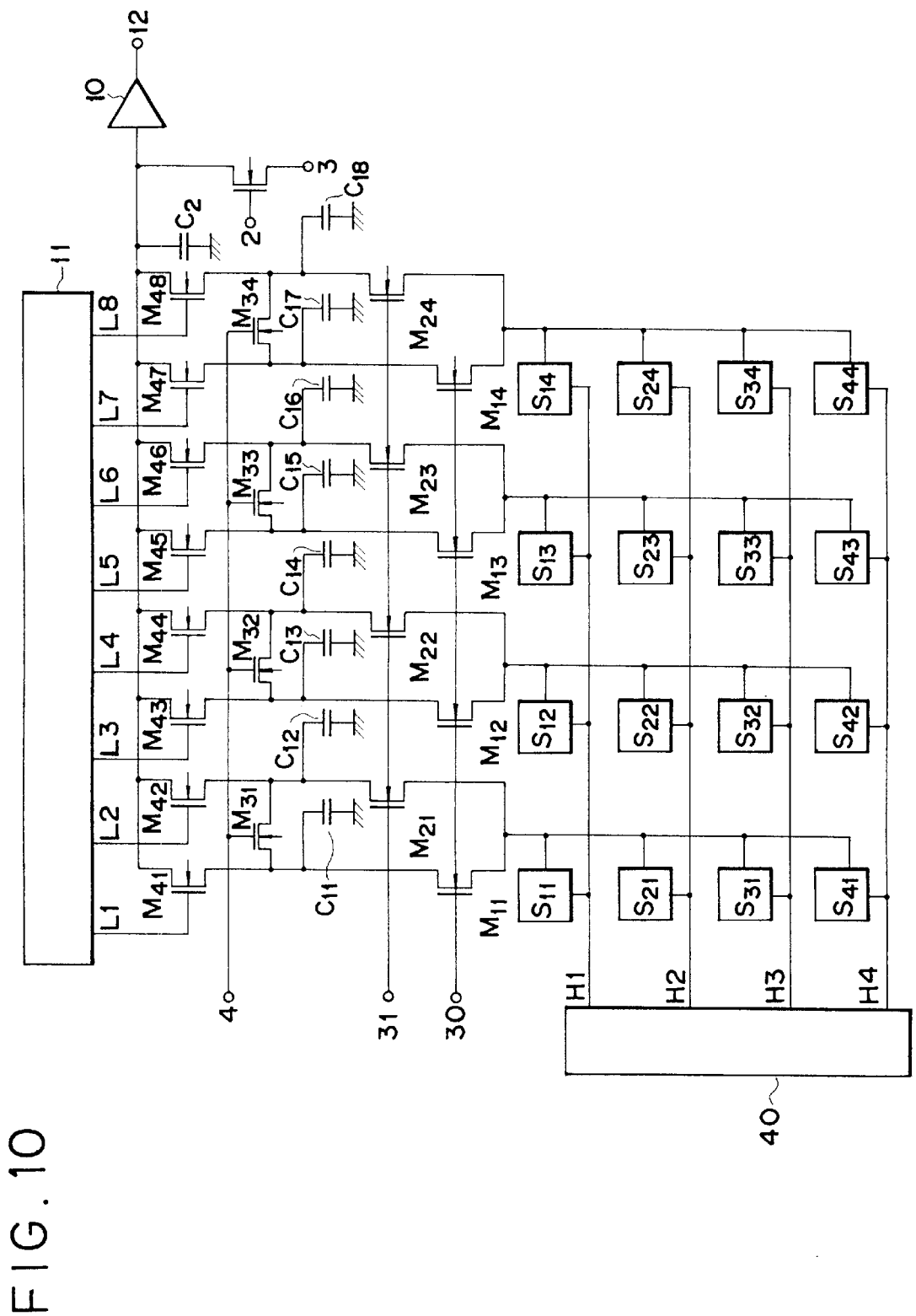
FIG. 10 is a circuit diagram for the signal processor according to the fifth embodiment of the present invention.

FIG. 10 is a circuit diagram for the signal processor according to the fifth embodiment of the present invention. The signal processor according to the fifth embodiment applies the structure of the third embodiment to a two-dimensional sensor. In the signal mixing operation of the present embodiment, after a signal to the capacitance element has been held for every two columns, a pulse is applied to the terminal 4 to connect two capacitance elements. Thus an average signal is obtained and then sequentially scanned.

Figure 11:
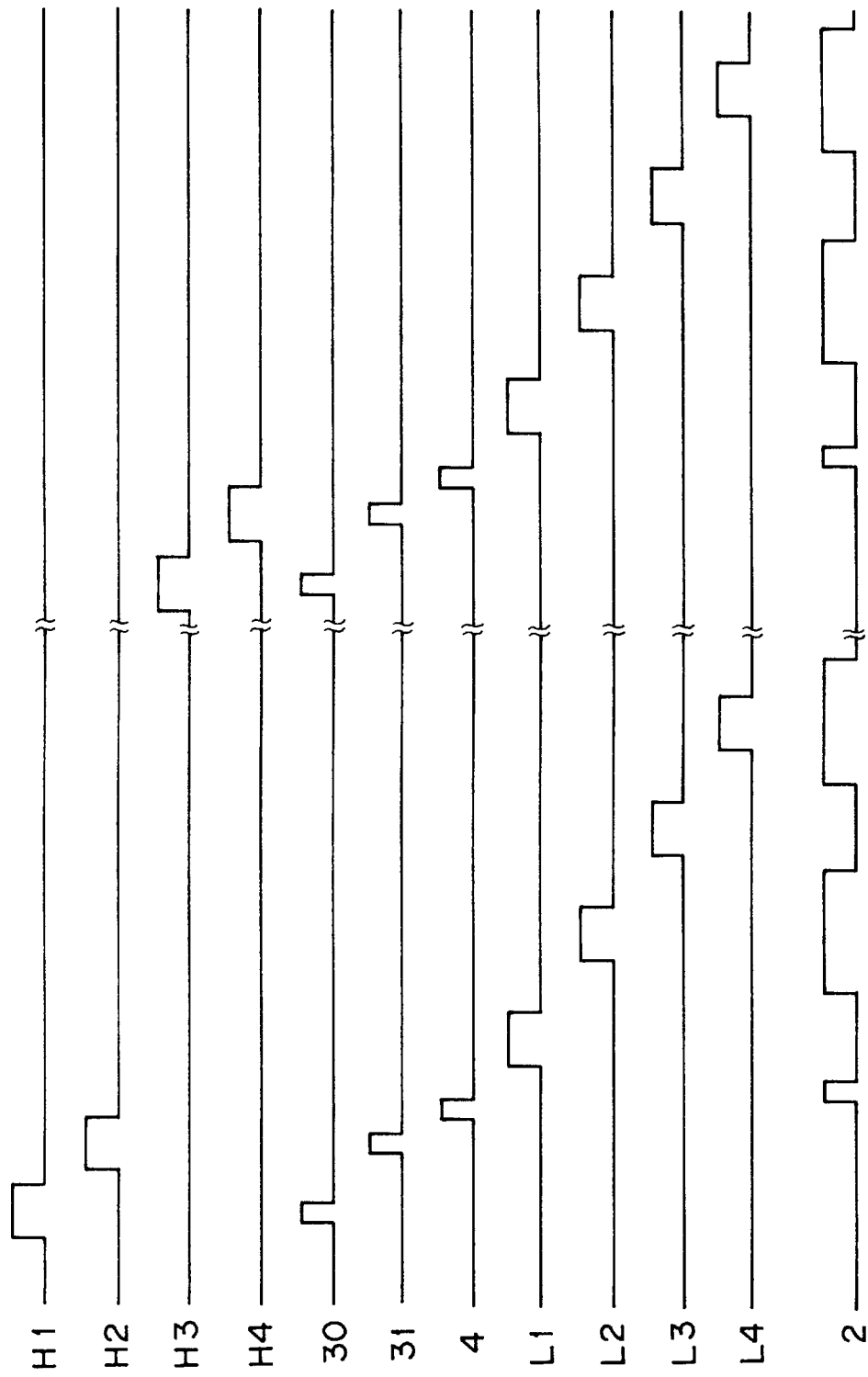
FIG. 11 is a drive timing chart for the signal processor according to the fifth embodiment of the present invention.

FIG. 11 is a drive timing chart for the fifth embodiment.

When the drive selection line H1 is selected and a clock pulse is applied to the terminal 30, the MOS transistors M11 to M14 are turned on, thus holding the signals in the capacitance elements C11, C13, C15, and C17. Next, when the drive selection line H2 is selected and a pulse is applied to the terminal 31 the MOS transistors M21 to M24 are turned on, thus holding the signals in the capacitance elements C12, C14, C16, and C18.

Next, a pulse is applied to the terminal 4 and the MOS transistors M31 to M34 are turned on to connect a pair of capacitance elements, respectively. Thus the average value of the output lines for two cells can be obtained for every two vertical lines. Then the average value output operation as well as the reset operation are repeated by combining an application of the reset pulse to the terminal 2 and an application of the pulses to the output lines L1 to L4.

Figure 12:
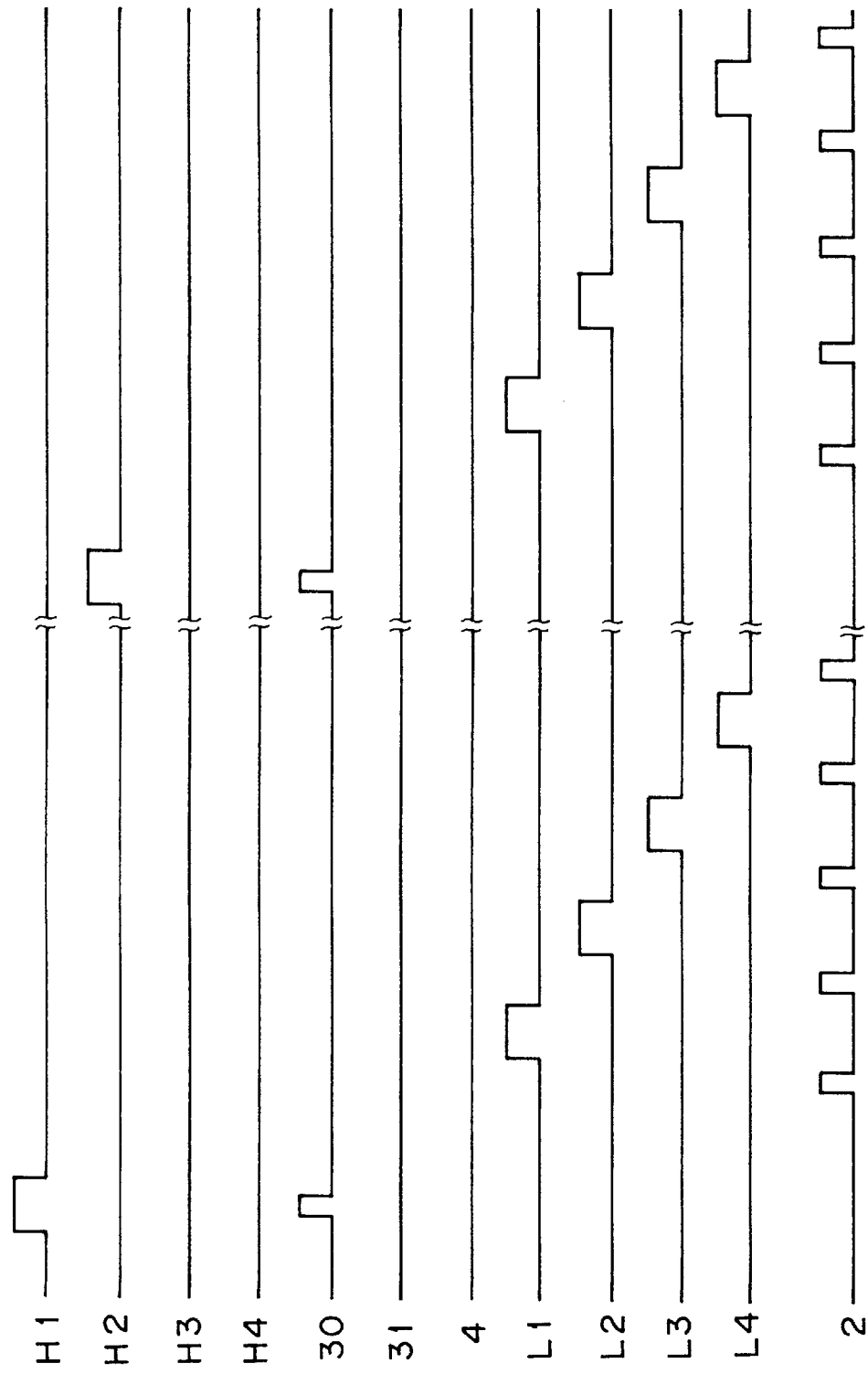
FIG. 12 is a drive timing chart for the signal processor according to the fifth embodiment of the present invention.

Thereafter, as shown in FIG. 12, the drive selection lines H1 to H4 are selected sequentially and one by one to hold signals in the capacitance elements C11, C13, C15, and C17. Since the scanning is sequentially made in accordance with the pulses L1 and L3, the amplified output signal for each cell appears as a time series signal to the terminal 12. The signals from the cells S11 through S44 that are outputted after the signal mixing is completed may be selected by controlling the scanning circuit 40 based on the information obtained from the signal mixing.

Figure 13:
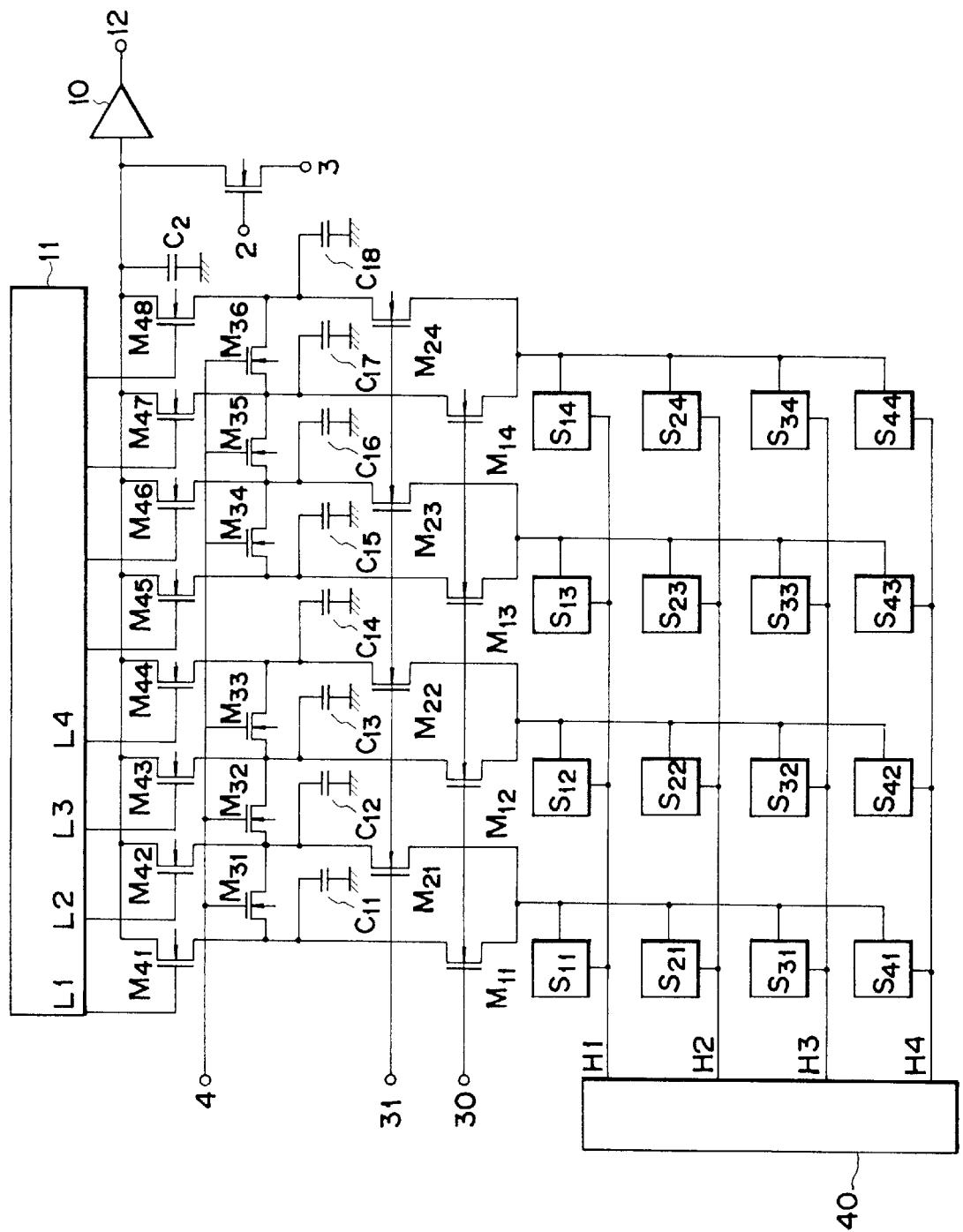
FIG. 13 is a circuit diagram for the signal processor according to the sixth embodiment of the present invention.

FIG. 13 is a circuit diagram for the signal processor according to the sixth embodiment of the present invention.

In the present embodiment, after the signals from four adjacent cells S11, S21, S12, and S22 have been held, their average value is obtained by mixing them.

Figure 14:
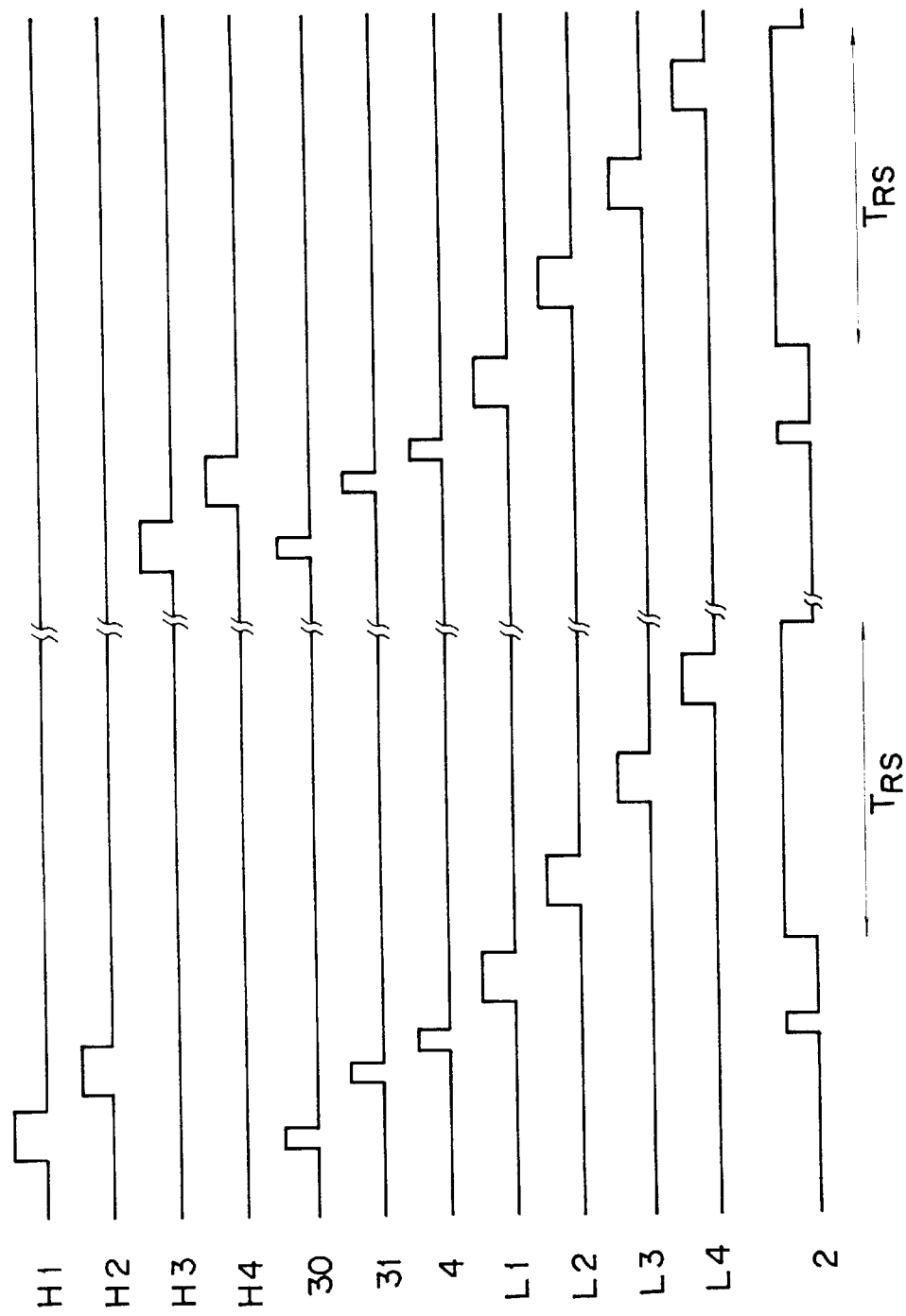
FIG. 14 is a drive timing chart for the signal processor according to the sixth embodiment of the present invention.
Figure 15:
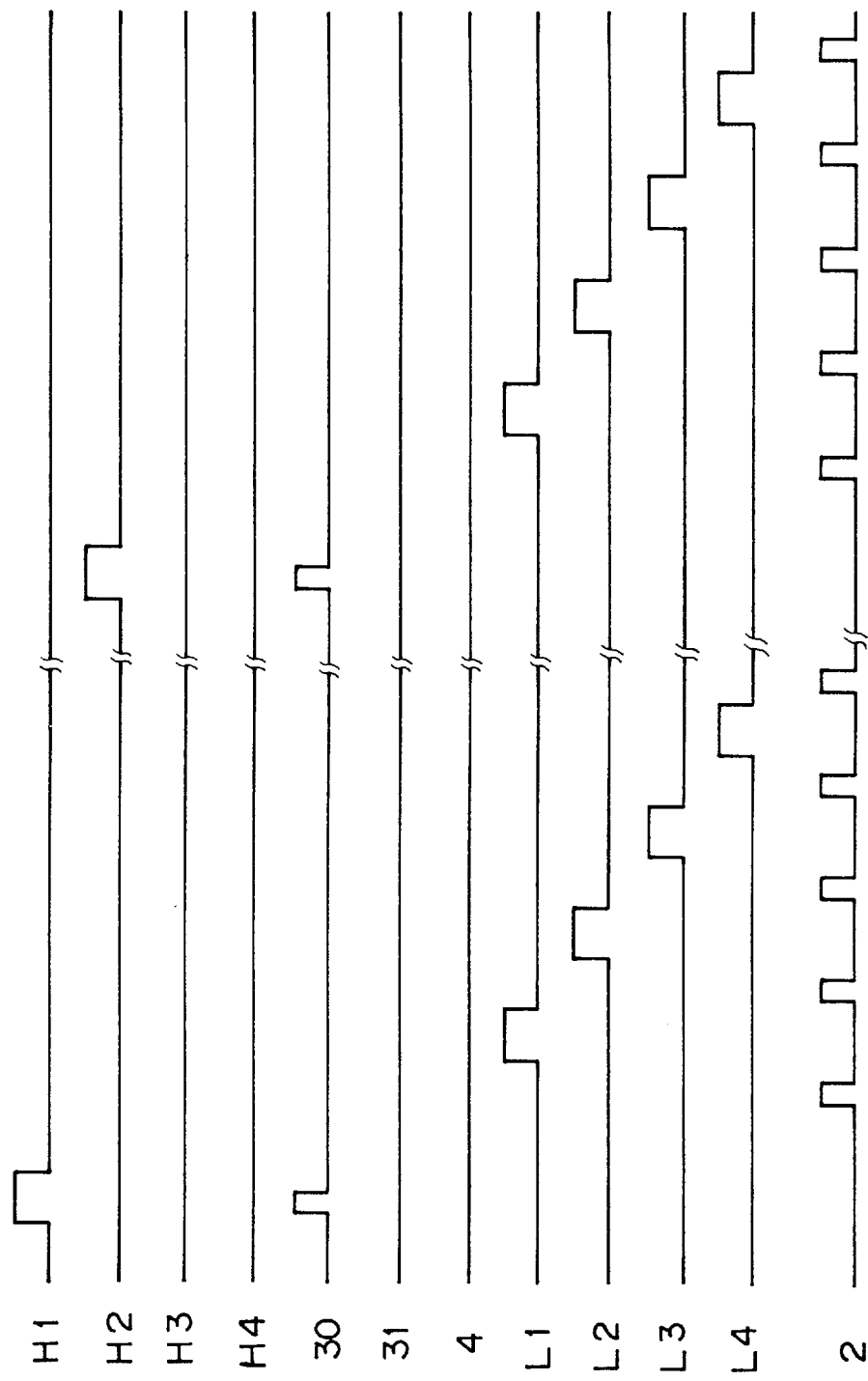
FIG. 15 is a drive timing chart for the signal processor according to the sixth embodiment of the present invention.

FIGS. 14 and 15 are drive timing charts for the present embodiment. According to the present embodiment, the signals from four adjacent cells are held and then mixed. Thus the amplified average value is outputted to the terminal 12 in response to the pulse L1. Then a reset operation is performed during the period $T_{RS}$. Sequentially the signals held in the next four adjacent cells are mixed and then outputted. Then the reset operation is resumed.

After the average value of the four blocks has been obtained, the signal for each cell is sequentially outputted to the terminal 12, as shown in FIG. 15. As discussed with respect to FIG. 10, the signals from calls from the calls S11 through S44 that are outputted after the signal mixing is completed may be selected by controlling the scanning circuit 40 based on the information obtained from the signal mixing.

Figure 16:
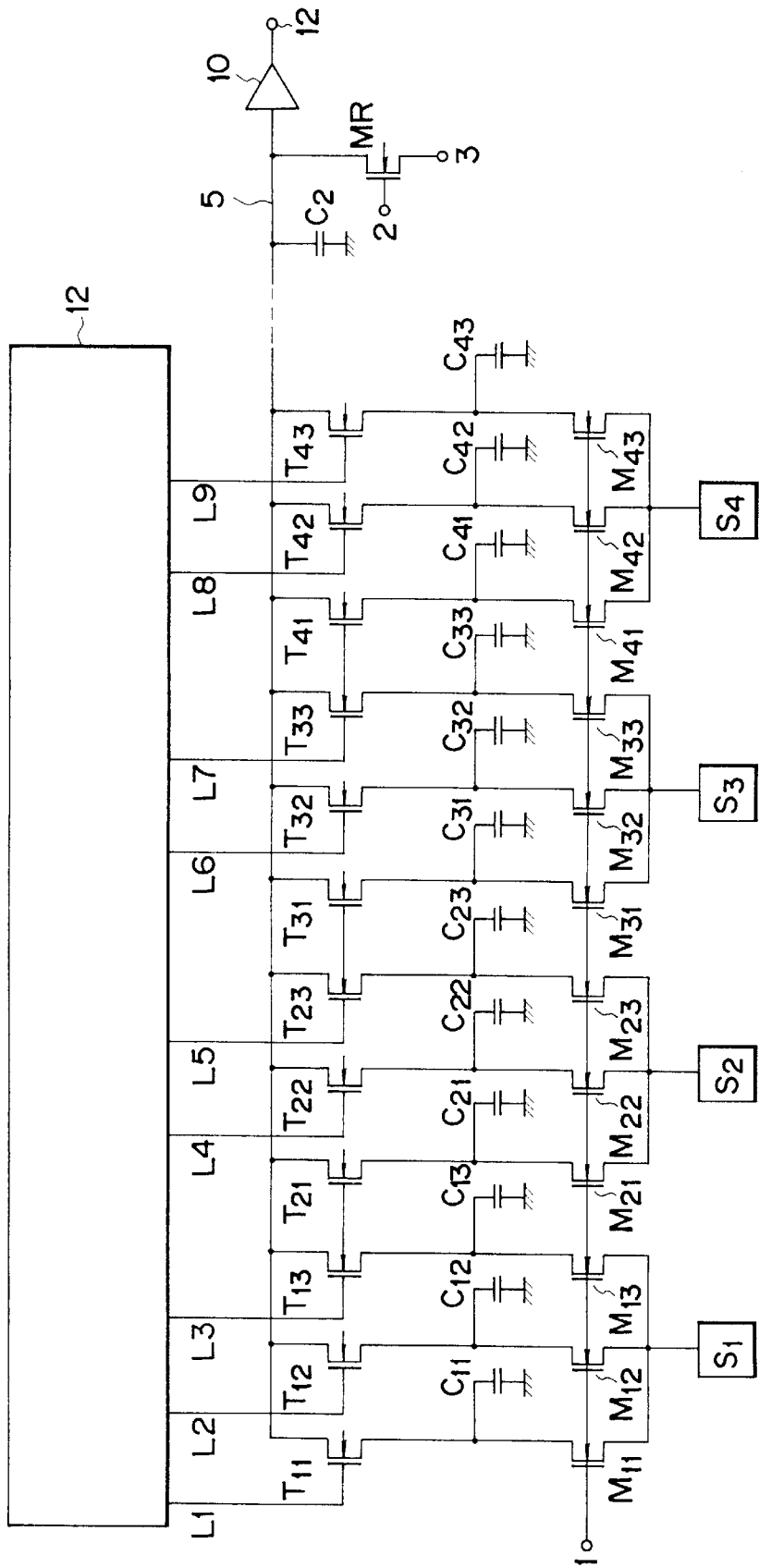
FIG. 16 is a circuit diagram for the signal processor according to the seventh embodiment of the present invention.

FIG. 16 shows the seventh embodiment according to the present invention.

In the seventh embodiment, in order to simplify its explanation, the signal sources S1, S2, S3, and S4 are arranged one-directionally to output the signal from each signal source as well as the average signal of the adjacent signals.

Figure 17:
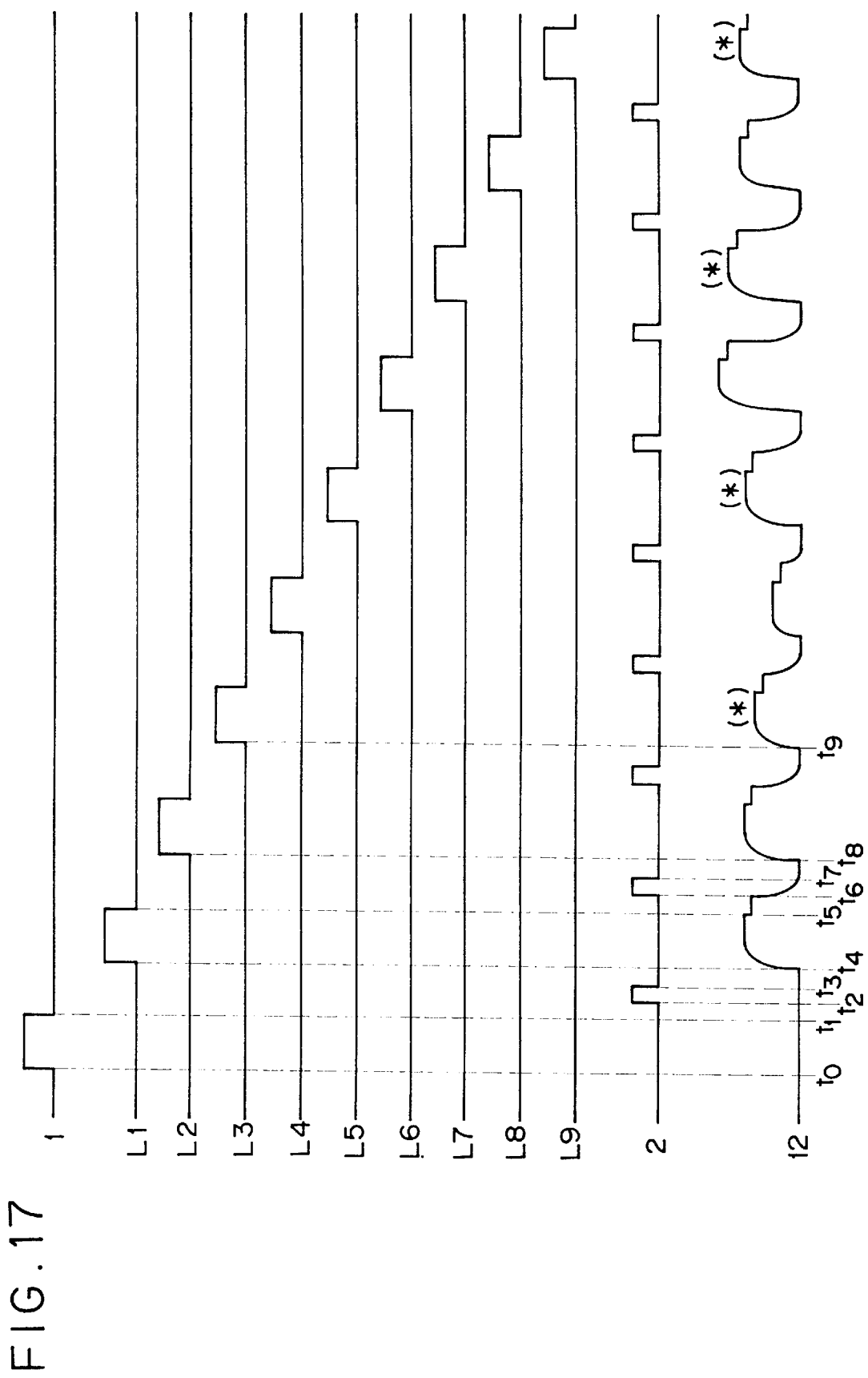
FIG. 17 is a drive timing chart for the signal processor according to the seventh embodiment of the present invention.

A brief explanation will be made below of the operation of the present embodiment with reference to the timing chart shown in FIG. 17.

When a pulse on the terminal 12 rises up at the time $t_0$, the MOS transistor Mij (i=1–4, j=1–3) is turned on. A signal is read out of each signal source to the capacitance element Cij (i=1–4, j=1–3). Three capacitance elements Cij (j=1–3) are connected in parallel to each signal source Si (i=1–4). The same signal Si is read out of the three capacitance elements.

At this time, the setting condition is $C_{i2}=2C_{i1}=2C_{i3}=C$ (i=1–4). When the pulse L1 rises up at the time $t_4$ and the pulse L2 rises up at the time $t_8$, the signals on the capacitance elements C11 and C12 are read out on the output line 5 and then are outputted to the terminal 12. At this time, when the reset voltage of the terminal 3 is GND and the signal voltages V1 on the capacitances C11 and C12 are read out on the output line 5, the voltage is expressed as follows:

$$C11V1/(C11+C2), C12V1/(C12+C2)(=CV1/(C+C2)) \quad (4)$$

Next when the pulse L3 rises up at the time $t_9$, the MOS transistors T13 and T21 are simultaneously turned on, whereby the voltages on the capacitors C13 and C21 are read out on the output line 5. When the signal voltages of the capacitance elements C21, C22, and C23 are V2, the signal voltage read on the output line 5 is as follows:

$$(C13V1/C21V2)/(C13+C21+C2)=(\tfrac{1}{2})\{C(V1+V2)\}/(C+C2) \quad (5)$$

This means that the average of signals from the signal sources S1 and S2 is outputted.

In this sequential operation, the signal Si is first outputted, the signals Si and $S_{i+1}$, are then outputted, and the signal $S_{i+1}$ is sequentially outputted. Since the average signal from the adjacent signal sources id serially outputted between the signals from the,original signal sources, the image resolution can be artificially improved.

For a simplified explanation, the signal sources are one-dimensionally arranged in the present embodiment. However, the image resolution can be two-dimensionally improved by two-dimensionally arranging the signal sources to perform the same operation on the vertical signal.

According to the eighth embodiment of the present invention, the signal from the photo cell is outputted as an outline underlining signal.

The following Laplacian is used for the image underlining method used conventionally.

$$\nabla^2 f = (\partial^2 f/\partial x^2) + (\partial^2 f/\partial y^2) \quad (6.1)$$

The method is well-known, which transforms the signal f(i, j) of each image to two-dimensional image data as follows:

$$f'(i,j)=5f(i,j)-\{f(i+1,j)+f(i-1,j)+f(i,j+1)+(i,j-1)\} \quad (6.2)$$

(refer to Rosenfeld Kak, "Digital Picture Processing", Academic Press).

$$f'(i)=3f(i)-\{f(i-1)+f(i+1)\} \quad (6.3)$$

Similarly the transforming method is effective for the one-dimensional image data. That is, subtracting the Laplacian (the average value of the horizontally and vertically adjacent images) of the image from the original image cat weaken the image-blur, thus realizing the underlined image.

Figure 18:
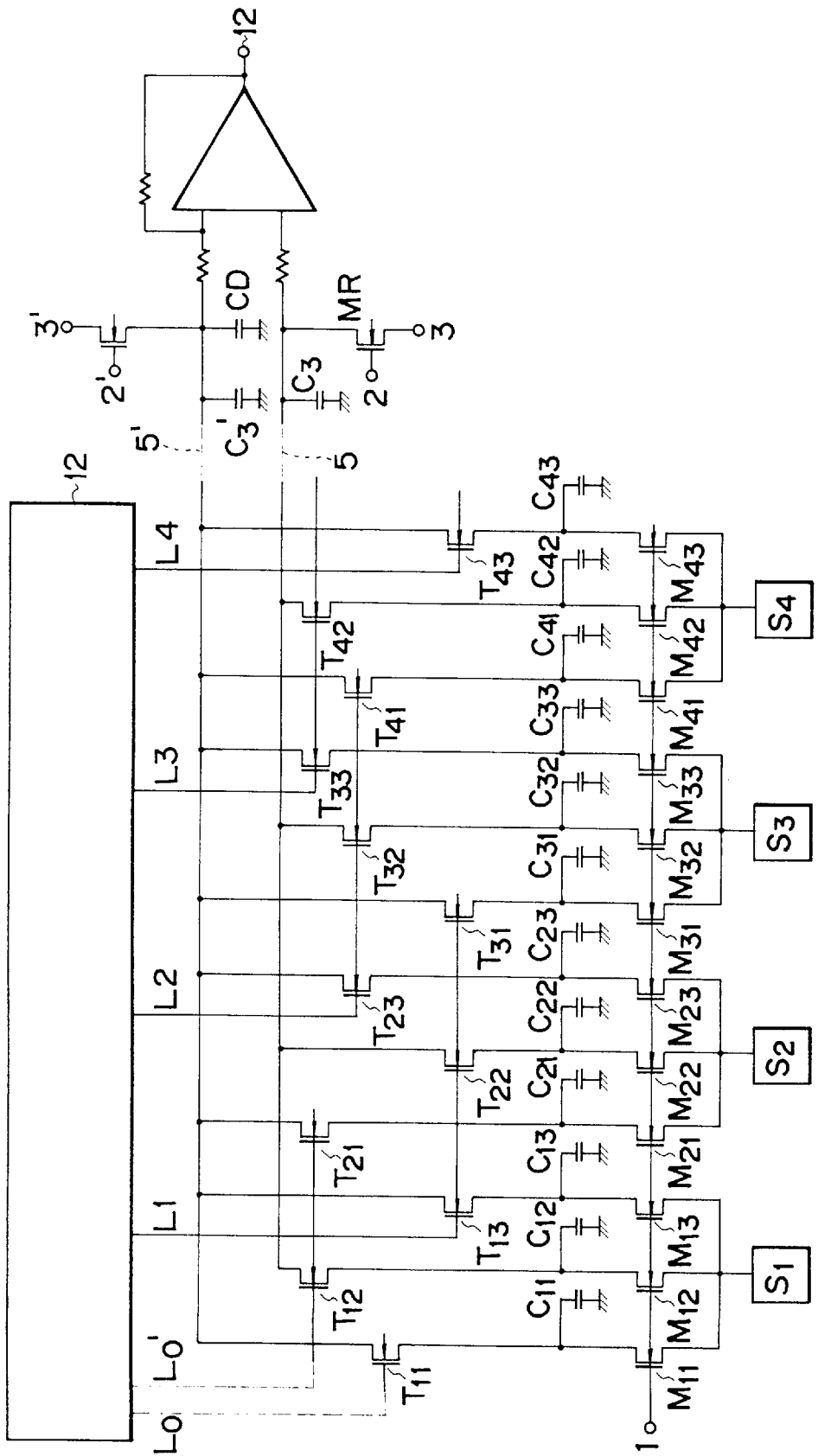
FIG. 18 is a circuit diagram for the signal processor according to the eighth embodiment of the present invention.

The operation of the present embodiment will be briefly explained with reference to FIG. 18. In the present invention, three signal holding capacitances Cij (j=1–3) are connected in parallel to each pixel Si (i=1–4), each capacitance value being set as follows:

$$C_{i2}=3C_{i1}=3C_{i3}=3C(i=1-4) \quad (6.4)$$

The operation is substantially the same as that of the conventional signal processor. First a signal from each pixel Si (i=1–4) is read to the capacitance Cij (i=1–4, j=1–3). Next, the present operation is different from the conventional operation in that the scanning circuit 12 transfers the signal held in the capacitance Cij to the output line 5. For example, when a pulse is inputted to the output line L1, the MOS transistors T13, T22, and T31 are turned on. As a result, the charges stored in the capacitance C22 are transferred to the output line 5 while the charges stored in the capacitances C13 and C31 are transferred to the output line 5'. If it is assumed that the signal voltages held by the capacitances C13, C22, and C31 are V1, V2, and V3, respectively, the transfer operation sets the reset potentials of the output lines 5 and 5' (the potentials of the terminals 3 and 3') to the GND level, whereby the potentials of the output lines 5 and 5' are expressed as follows:

$$V5=C22V2/(C22+C3)=3CV2/3C+C3) \quad (6.5)$$

$$V5' = (C13V1 + C31V3)/(C13 + C31 + C3' + C_D) \quad (6.6)$$
$$= C(V1 + V3)/(2C + CD + C3')$$

where C3 represents chiefly a drain parasitic capacitance of the MOS transistor Tmn (m=1–4, n=1–3) connected to the output lines 5 and 5', and C3' is a wiring capacitance of the output lines 5 and 5'. In the present embodiment, a dummy MOS transistor is connected to the output line 5 to equalize the wiring structure so that the capacitances C3 and C3' are agreed to each other. Moreover setting the dummy capacitance $C_D$ to value C can equalize the denominators of the expressions (6.5) and (6.6). Hence the element 30 can produce the difference (V5–V5'). The photoelectric conversion device can calculate the expression (6.3) to underline the image.

In the present embodiment, the one-dimensional photoelectric conversion device is shown to simplify the explanation thereof. It is apparent that a two-dimensional photoelectric conversion device can underline the image by operating the expression (6.2) on the same chip in the same manner.

In the present embodiment, the expression (6.3) is operated in order to underline the outline of an image. However, only the image of the outline can be outputted by operating the following expression:

$$f'(i)=2f(i)-\{f(i-1)+f(i+1)\} \quad (6.7)$$

In concrete operation, the process can be realized by setting the values of the signal holding capacitances (shown in FIG. 18) in accordance with the following expression:

$$C_{i2}=2C_{i1}=2C_{i3}=2C(i=1-4) \quad (6.8)$$

Similarly it is apparent that a two-dimensional photoelectric conversion device can be realized. In the present embodiment, the holding capacitance values are set in accordance with the expressions (6.4) and (6.8). If necessary, the values may be readily varied.

Figure 19:
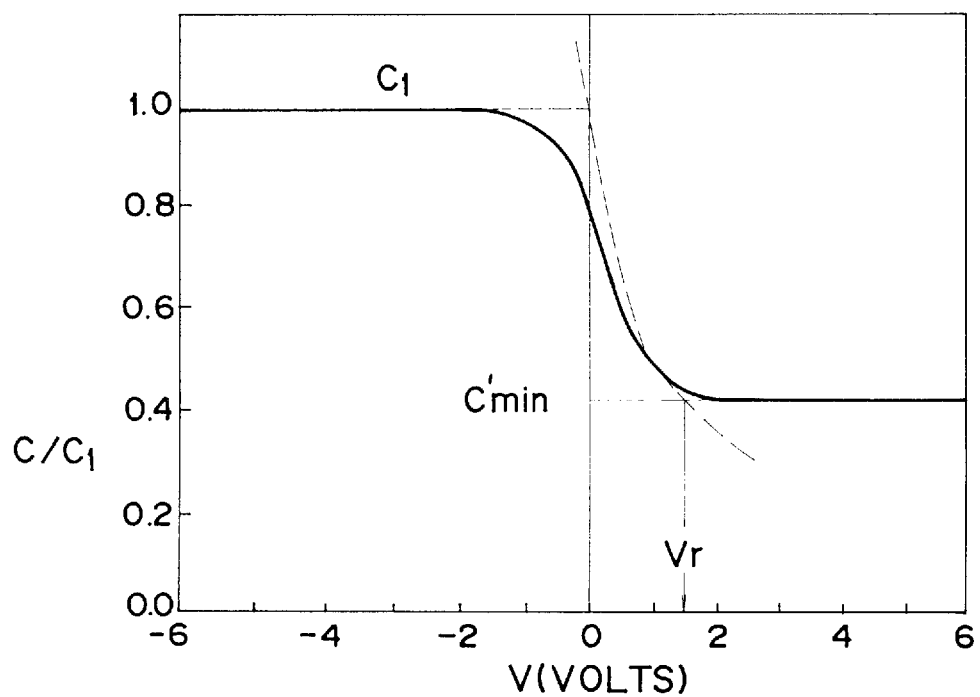
FIG. 19 is a line diagram showing the characteristics of the variable capacitor acting as a capacitance element used for the present invention.

Moreover, it is known that a MOS capacitance forming the capacitance element reflects the capacitance characteristics with respect to the gate to substrate voltage, as shown in FIG. 19. Therefore in the present invention, the holding means formed of a MOS capacitance can be externally adjusted in its capacitance value by varying the substrate potential.

Figure 20:
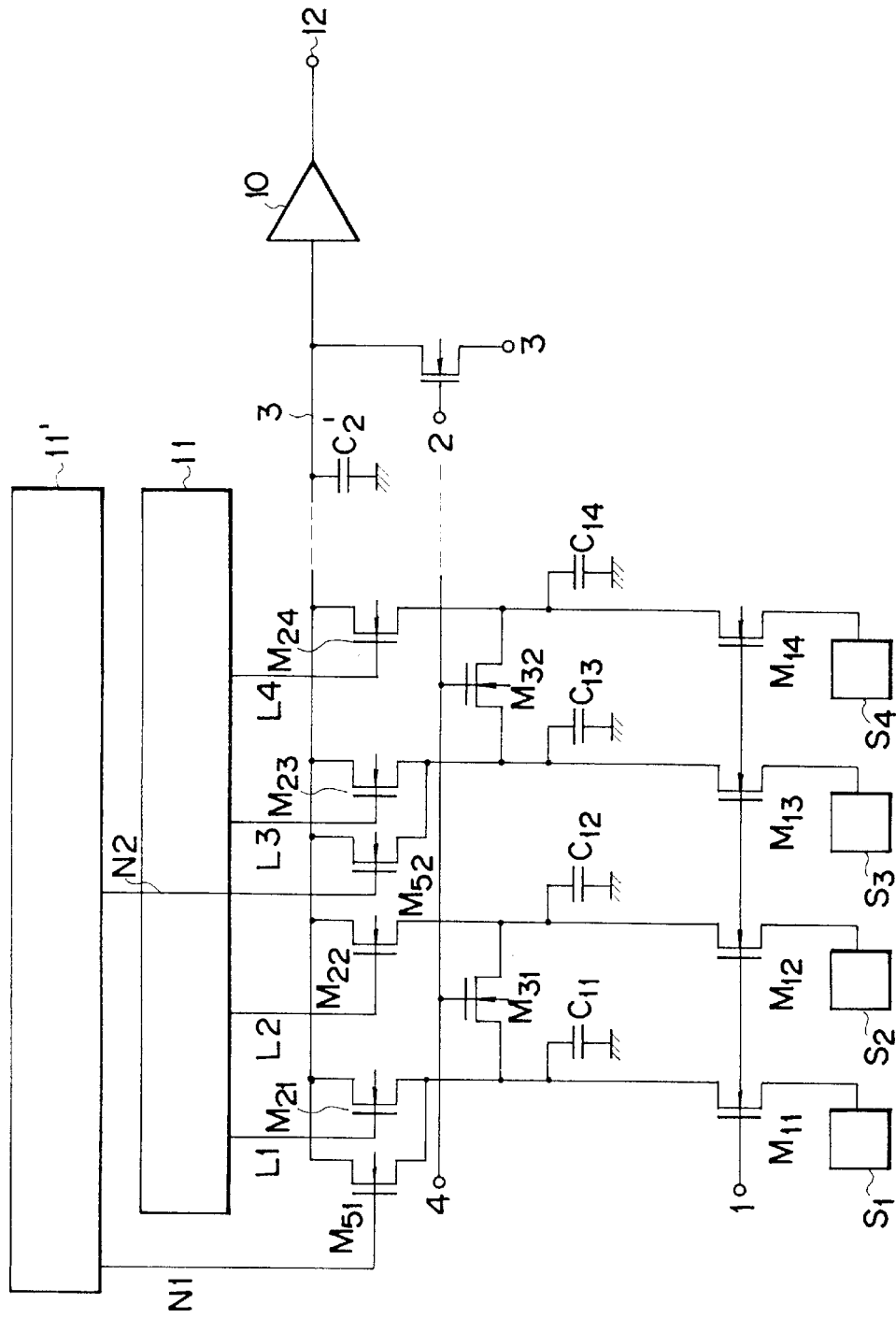
FIG. 20 is a circuit diagram for the signal processor according to the ninth embodiment of the present invention.
Figure 21:
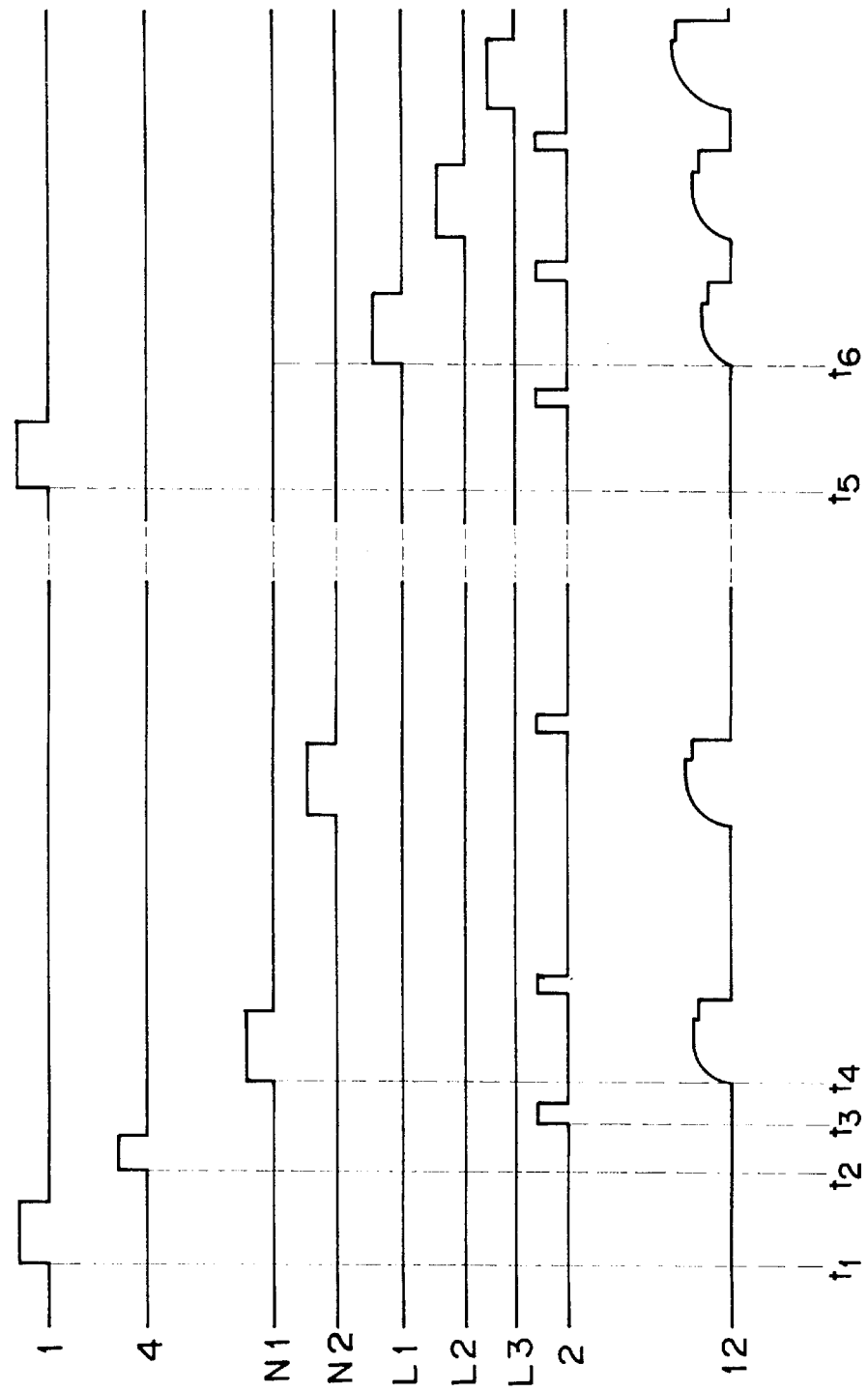
FIG. 21 is a drive timing chart for the signal processor according to the ninth embodiment of the present invention.

FIG. 20 is a circuit diagram for the signal processor according to the ninth embodiment of the present invention and FIG. 21 is its drive timing chart.

The present embodiment differs from the third embodiment shown in FIG. 6 in that the scanning circuit 11' and the MOS transistors M51 and M52 are prepared to output sequentially the average value.

In the present embodiment, a pulse at a high level is inputted to the terminal 1 at the time $t_1$ to hold the output signals of all the cells S1 to S4 to the capacitance elements C11 to C14, respectively. Next, a pulse at a high level is inputted to the terminal 4 at the time $t_2$ so that two adjacent capacitance elements are connected in common to mix signals. When a pulse at a high level is applied to the terminal 2 at the time $t_3$, the common output line 5 is reset to the reset potential of the terminal 3.

Next, the scanning circuit 11' inputs a pulse at a high level to the gate of the MOS transistor M51 at the time $t_4$ to output the average value.

In such a manner, the pulse at high level of the sequential scanning circuit 11' is shifted and then the amplified average value is chronologically outputted to the terminal 12.

After the average value has been completely outputted, the discrete signal outputting operation is performed for each cell. Signals of all the cells S1 to S4 are held in the capacitance elements C11 to C14 at the time $t_5$. Next the scanning circuit 11 supplies a shift pulse at a high level to the gate of the MOS transistor M21 at the time $t_6$ to output the signal of the cell S1 to the terminal 12. Since the pulse at a high level is shifted to the output lines L1 to L4, the signals of all the cells are amplified as sequential time series signals that appear on the terminal 12.

Figure 22:
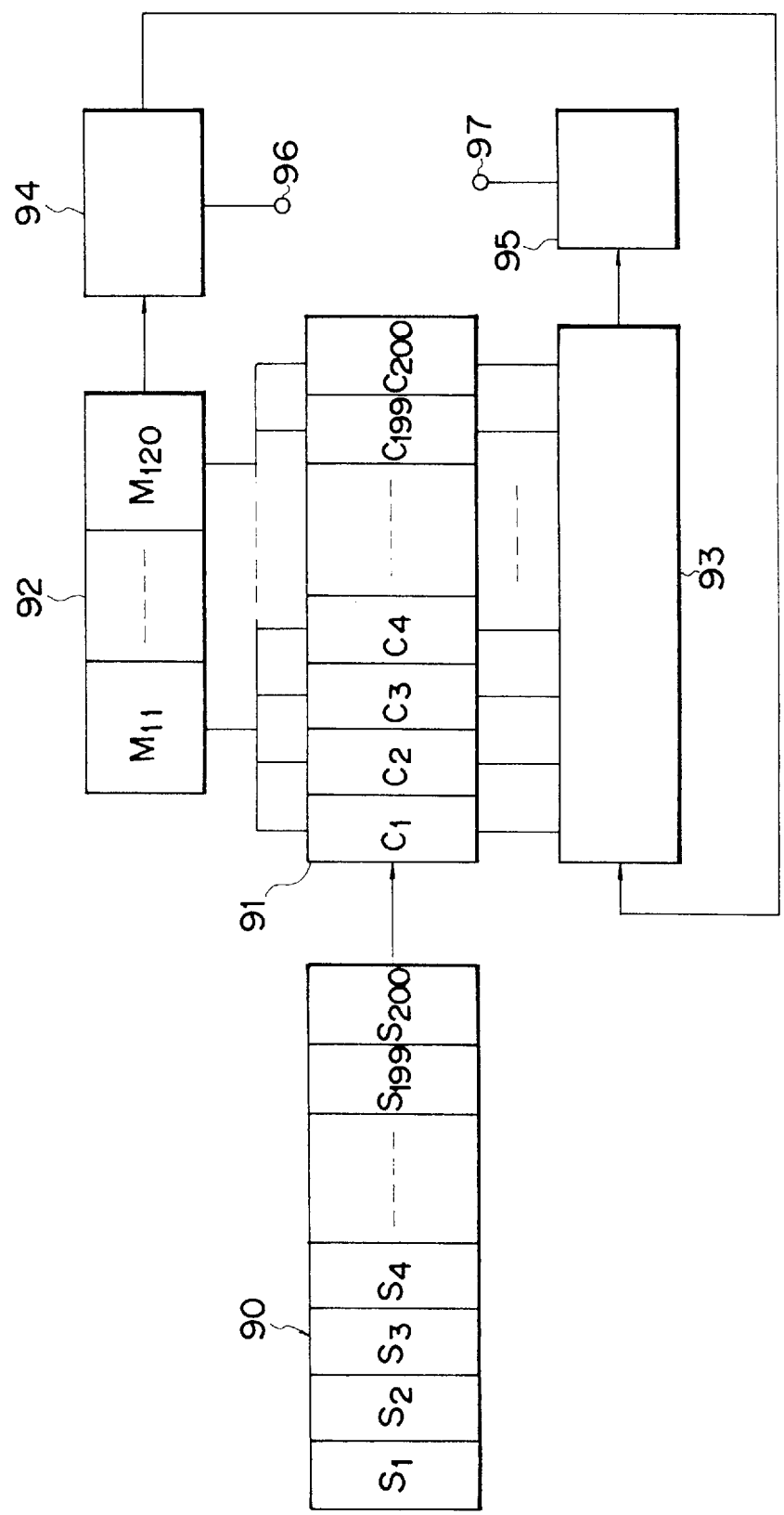
FIG. 22 is a block diagram for the signal processing system used for the signal processor according to the present invention.

FIG. 22 is a block diagram showing a system employing the signal processor according to the present invention. The sample hold circuit 91 acting as signal holding means holds respectively 200 output signals as signals for 200 cells from the cell array 90 acting as a signal source.

The signal mixing means 92 mixes four adjacent signals using the signals held to produce 50 discrete mixed signals. The mixed signal processing circuit 94 processes the compressed signals, determines the area to be subjected to a high resolution signal process, and then supplies the area specifying signal to the discrete signal processing circuit 93. If the discrete signal processing circuit specifies the first block in the cells S1 to S4 as a specified area, only the discrete signal is taken out of the sample and hold circuit 91 corresponding to the first block to execute a signal process.

As described above, since the output terminal 96 produces low resolution (low density) information based on the compressed mixed signal, the information of the entire signals can be roughly obtained. In addition, since high resolution (high density) information of a specific area is provided at the output terminal, detailed information of a part of the entire signal can be obtained.

As described above, according to the embodiments of the present invention, since fewer mixed signals than signal sources are processed, the signal processing rate can be improved.

Figure 23:
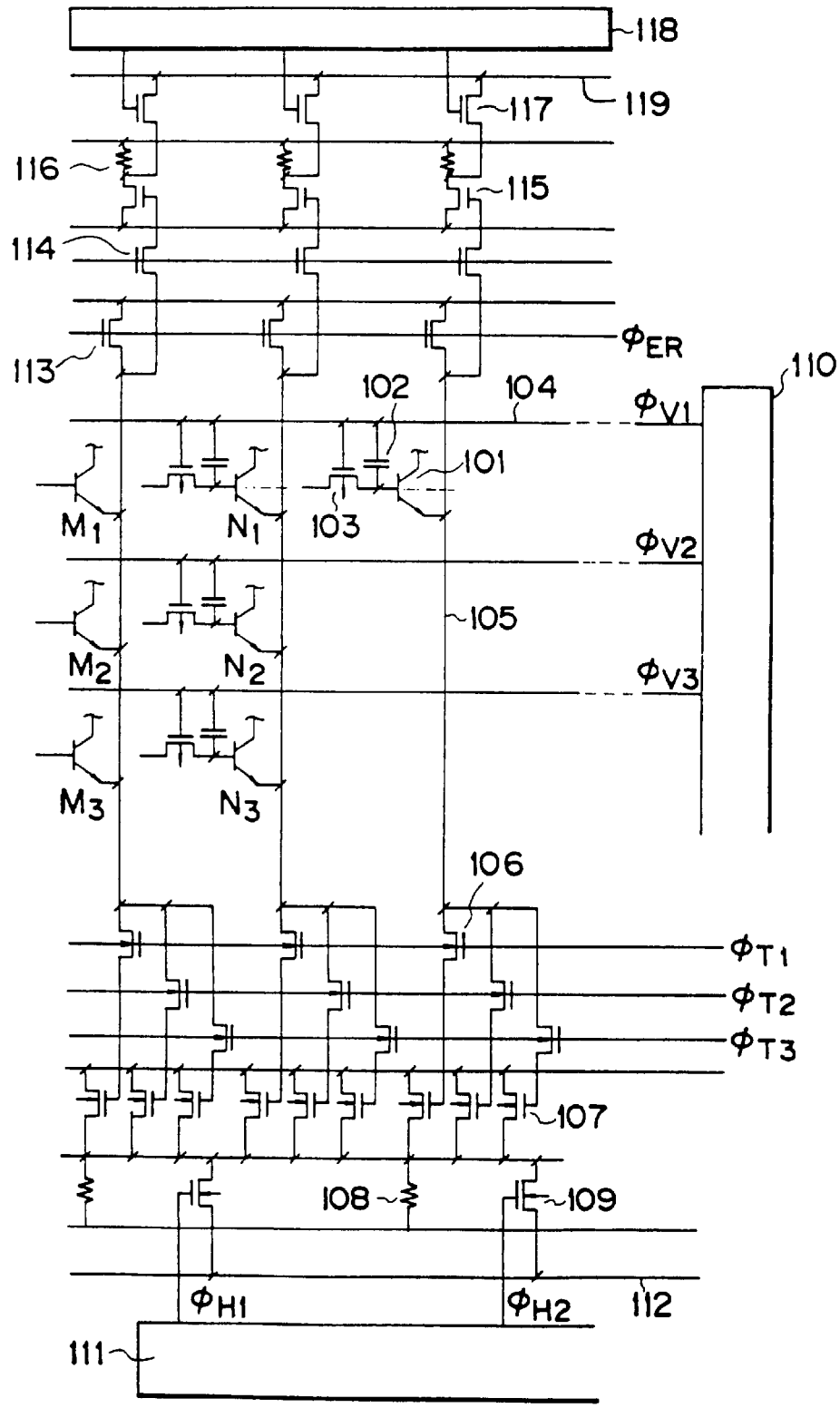
FIG. 23 is a circuit diagram for the signal processor according to the tenth embodiment of the present invention.

FIG. 23 is a drawing indicating best the feature of the tenth embodiment of the present invention. Referring to FIG. 23, numeral 101 represents a sensor bipolar transistor, 102 represents a drive MOS capacitance, 103 represents a base reset MOS transistor, 104 represents a drive wiring, 105 represents an output wiring, 106 represents a signal transfer MOS transistor, 107 represents an input transistor for a MOS-type inversion amplifier, 108 represents a load resistor for the MOS-type inversion amplifier, 109 represents a horizontal transfer MOS transistor, 110 represents a vertical shift register for supplying a drive signal to the drive wiring, 111 represents a horizontal shift register for driving the horizontal transfer MOS transistor, 112 represents a common output line, and 113 represents an emitter reset MOS transistor.

Numeral 114 represents a signal transfer MOS transistor, 115 represents an input transistor for a second MOS-type inversion amplifier, 116 represents a load resistor for the second MOS-type inversion amplifier, 117 represents a second horizontal transfer transistor, and 119 represents a second common line.

Figure 24:
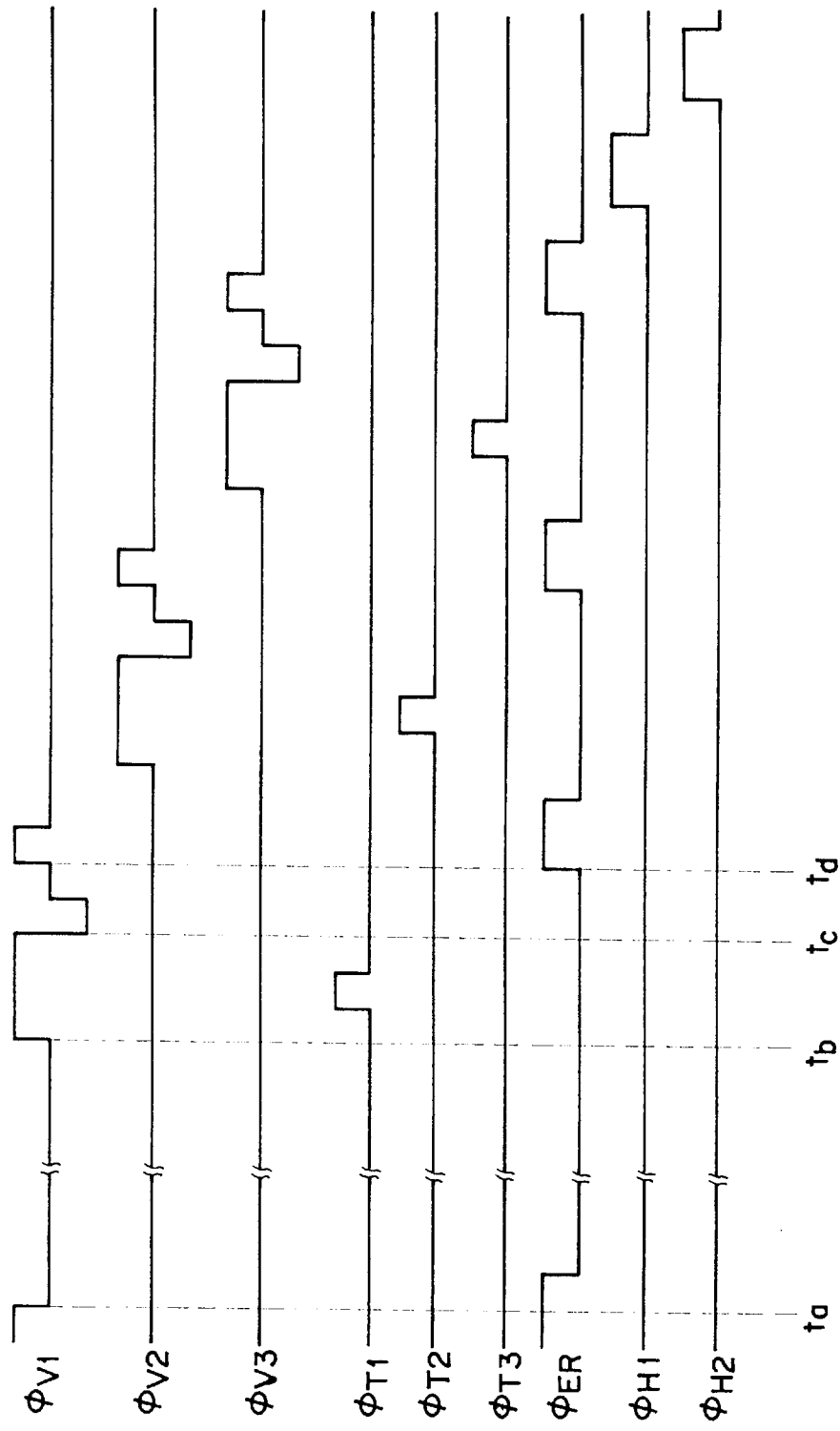
FIG. 24 is a drive timing chart for the signal processor according to the tenth embodiment of the present invention.

The operation of the present embodiment includes (1) an accumulating operation (2) a reading operation, and (3) a resetting operation. In FIG. 24, the accumulating operation starts from the time (time $t_a$) when a reverse bias is applied between the base and emitter of the sensor bipolar transistor 101 after a completion of the reset operation. The base potential increases as holes produced due to incident light are accumulated in the base region and the depletion layer between the base and the collector. With the positive $\Phi V1$ at the accumulation completion time (time $t_b$), the reading operation starts when the base potential is positively boosted via the capacitive coupling of the drive MOS capacitance 106 to bias forward between the base and the emitter. Since the emitter potential comes to a certain potential difference near to the base potential due to the capacitance load, the differential of the base potential at the accumulating operation appears on the emitter terminal. Then the transfer MOS transistor is turned on at the timing $\Phi T$. The signal is transferred to the gate of the input transistor 107 in the amplifier via the output line 105 and the transfer MOS transistor 106. Next when the transfer MOS transistor 106 is turned off, a reset operation is started.

The reset operation in the present invention includes two operations combined. In the first reset operation (time $t_c$), the base reset MOS transistor 103 is turned on to ground the base. In the second reset operation (time $t_d$), the positive $\Phi ER$ first turns on the emitter reset MOS transistor 103 to ground the emitter and the $\Phi V1$ is made positive. Since the base is positively boosted to bias forward between the base and the emitter, the recombination of the electrons and holes-reduces the base potential. When the $\Phi V1$ is made off, the reset operation is completed. Then the next accumulating operation is started. While the accumulation proceeds at the pixel portion, the MOS-type inversion amplifier receives the signal transferred to its gate and then current-amplifies it. The signal is read out sequentially to the common output line in response to the pulses $\Phi H1$–$\Phi H3$.

The present embodiment provides that the sensor bipolar transistor with sufficiently high current amplification factor enables reading the sensor output plural times. Hence according to the configuration of the present invention, a rough image process is made in accordance with the addition output and then the sensor output is sequentially read again out for each pixel. Hence the configuration is very effective to perform a signal process.

An explanation will be given in detail of the operation of the above circuit with reference to FIG. 24.

The signals corresponding to the pixels M1 and N1 are read out at the time $t_b$. The signal is read to the gate of the input transistor 107 in the MOS-type inversion amplifier by turning on the transfer MOS transistor 106 using ΦT1. After the transistor 106 is turned off by the ΦT1, the pixels M1 and N1 are reset to resume the next accumulation. Sequentially, when the ΦV2 and ΦT2 are made on, the signals M2 and N2 are read out. After the pixels M2 and N2 are subjected to the reset accumulation operation, the signals M3 and N3 are sequentially read out by making on the ΦV3 and ΦT3. The input transistor 107 has a current flowing between its source and its drain in accordance with the signal inputted to its gate. The resistor 108 produces a potential drop due to the flowing current. As described in FIG. 23, when plural input transistors 107 are connected to a single load resistor 108, an addition current of the plural transistors flows through the load resistor 108. In FIG. 23, the voltage drops corresponding to the signals of six pixels M1 to M3 and N1 to N3 are added and then outputted. As described above, the sensor can perform a simple signal addition by merely receiving a pulse. In the present embodiment, a 2×3 pixel addition has been explained. However, the connections may be changed for other uses without limiting to the present embodiment.

When it is desired to output respectively the sensor output for each pixel, it may be read out to the second common output line 119 by operating the second reading system and the elements 114 to 118 shown in FIG. 23.

Figure 25:
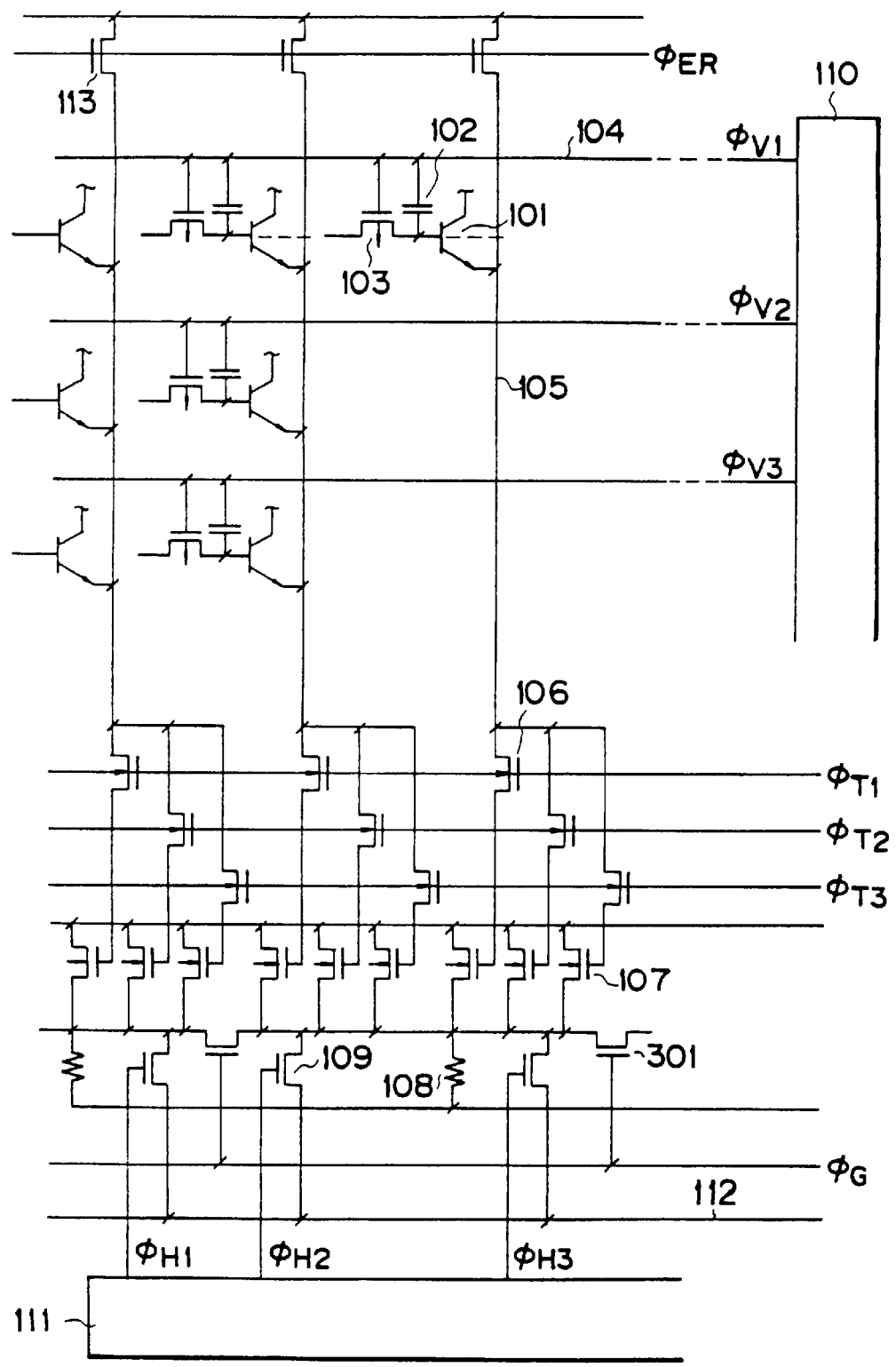
FIG. 25 is a circuit diagram for the signal processor according to the eleventh embodiment of the present invention.
Figure 26:
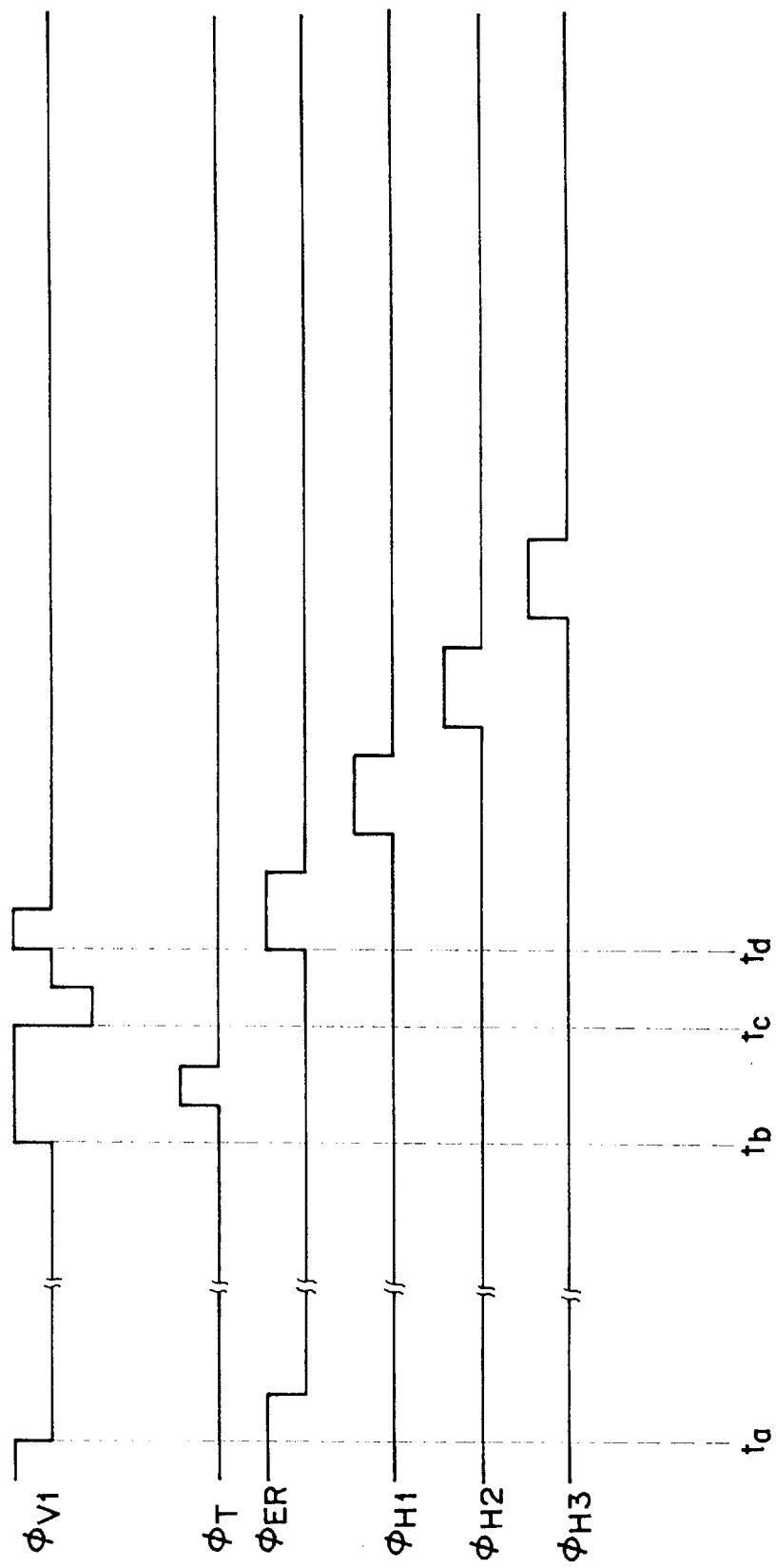
FIG. 26 is a drive timing chart for the signal processor according to the eleventh embodiment of the present invention.

FIG. 25 is a diagram showing best the feature of the eleventh embodiment. Numeral 301 represents a MOS transistor switch. In the present embodiment, when the MOS transistor switch 301 is turned on in response to ΦG to operate, at the timing shown in FIG. 24, an addition of the 2×3 pixel signals can be derived. When the MOS transistor switch 301 is turned off in response to ΦG to operate at the timing shown in FIG. 26, each pixel signal can be read sequentially.

Figure 27:
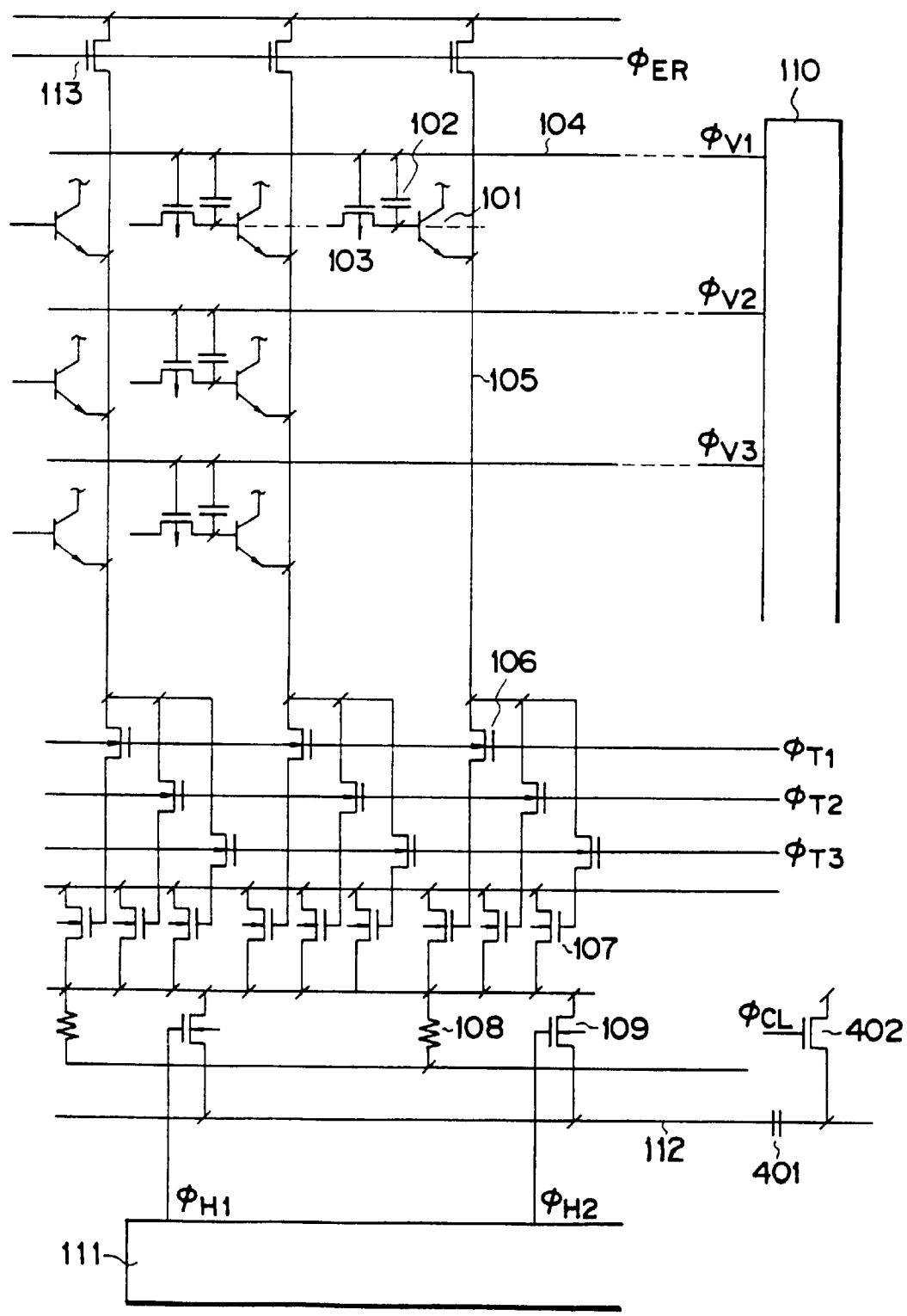
FIG. 27 is a circuit diagram for the signal processor according to the twelfth embodiment of the present invention.
Figure 28:
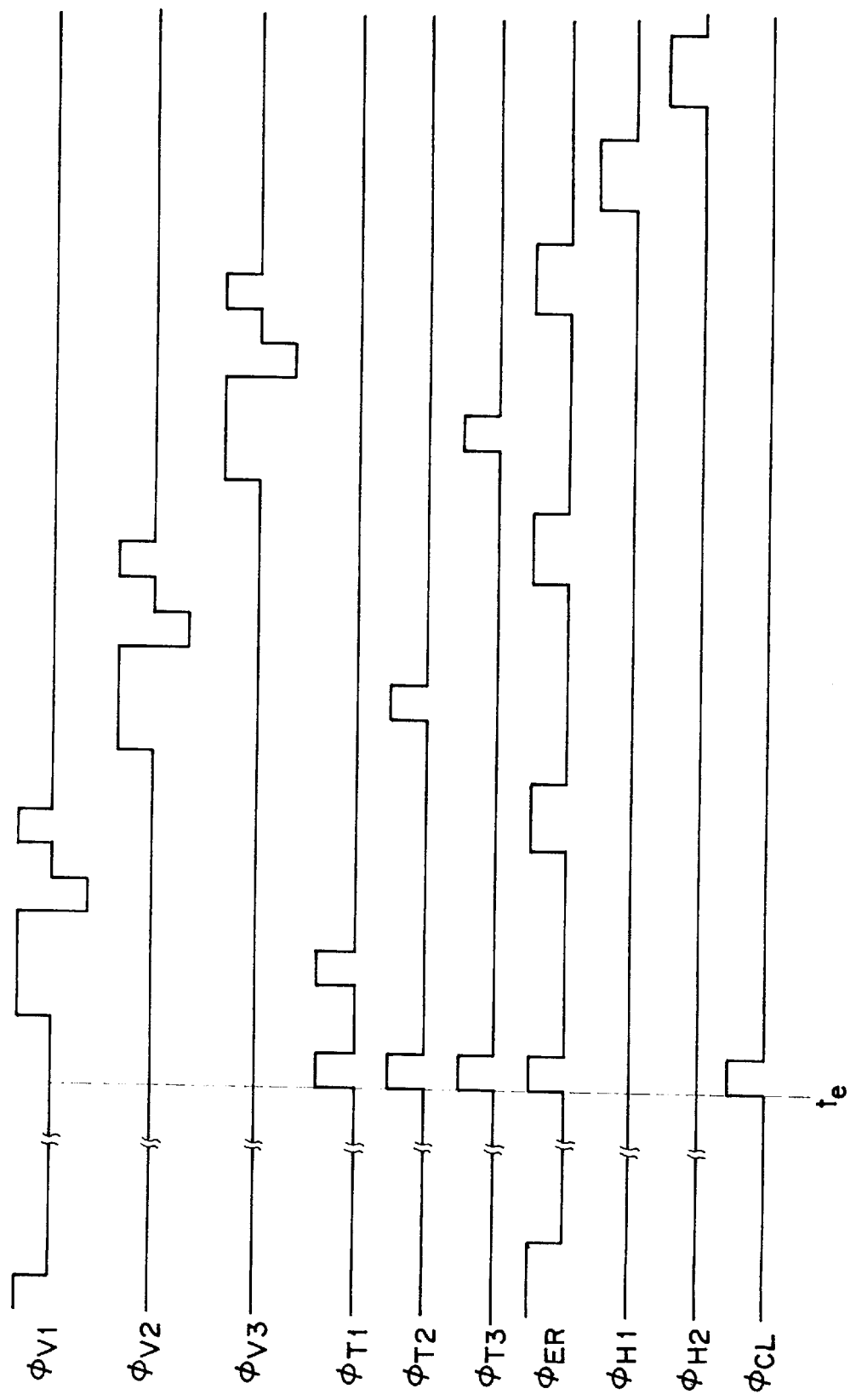
FIG. 28 is a drive timing chart for the signal processor according to the twelfth embodiment of the present invention.

FIG. 27 is a drawing indicating best the feature of the twelfth embodiment. Numeral 401 represents a clamp capacitance and 402 represents a reset MOS transistor. In an explanation on the operation of the present circuit shown in FIG. 28, the reset is made to a fixed potential by turning on the reset MOS transistor 402 while the emitter reset voltage is read out at the timing $t_e$ before the sensor signal reading time. Then since the output can be read out, the fixed variations occurring in each reading system, for example, offset variations in the amplifier unit, are removed, whereby the output can be obtained with higher accuracy.

Figure 29A:
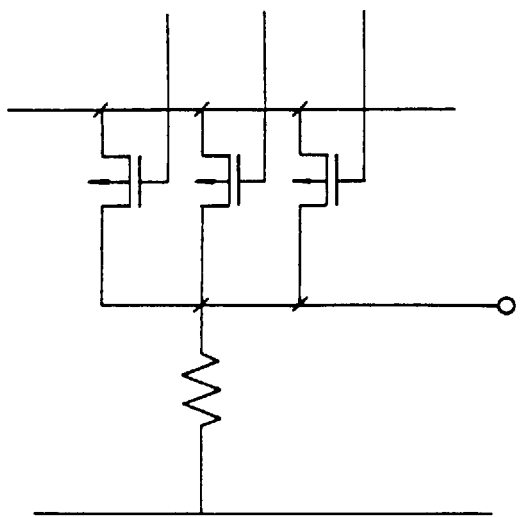
FIG. 29A is a circuit diagram partially showing the signal processor according to the thirteenth embodiment of the present invention.
Figure 29B:
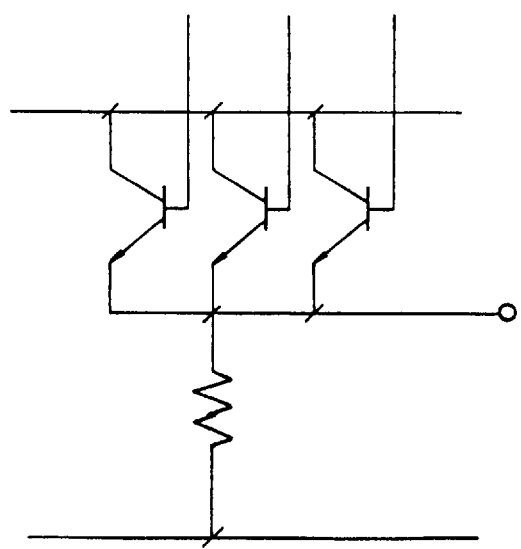
FIG. 29B is a circuit diagram partially showing the signal processor according to the thirteenth embodiment of the present invention.

The reading amplifier should not be limited to the above mode. According to the thirteenth embodiment, as shown in FIGS. 29A and 29B, the amplifier may include P-channel MOS transistors (FIG. 29A) or bipolar transistors (FIG. 29B). The resistor should not be limited to a fixed resistor.

Moreover, according to the present invention, the amplification-type sensor should not be limited to BASIS. The same effect can be obtained using charge modulation devices (CMDs) or MOS-type amplification-type photoelectric conversion elements.

The present embodiment described above is effective in case where it is desired to recognize the average signal level of an image area to execute a signal process in response to a signal from a sensor, or to recognize a rough distribution in signal amount of an image area to execute a detailed signal process to a specific area. For example, in order to examine the detailed distribution in signal amount after the darkest area in an image area has been roughly extracted, the conventional sensor must execute a sophisticated image process. It is necessary to perform the above averaging process and an area division after all signals of an image area have been first stored in a memory in a signal processing system. Hence such a process makes the signal processing system complicated and large, thus taking a relatively long processing time.

To the contrary, according to the present embodiment, a means is arranged which adds and outputs signals from plural pixels in response to an external simple pulse to the signal reading portion in a sensor, and then supplies the output to the signal processing system. Thus the information processing system can be more simplified, whereby the processing time can be shortened.

As described above, preparing the means for adding and outputting signals from plural signal sources allows the signal processor to be further simplified and miniaturized, thus decreasing the signal processing time.

What is claimed is:

1. A signal processor comprising:

plural signal sources each including a photosensor;

plural signal holding means for holding output signals from said plural signal sources;

signal mixing means for mixing at least two discrete output signals among the output signals held by the plural signal holding means to output plural discrete mixed signals; and an amplifier arranged between said signal sources and said signal holding means.

2. A signal processor comprising:

at least four signal sources each including a photosensor;

plural signal holding means for holding output signals of said signal sources;

signal mixing means for mixing at least two discrete signals among output signals held by said plural signal holding means to produce at least two mixed signals; and discrete signal outputting means for producing respectively the output signals from said plural signal sources, wherein said signal mixing means includes a switch which connects at least said two signal holding means to each other, and a scanning circuit, and wherein said discrete signal outputting means includes a switch arranged to each of said signal holding means, and a scanning circuit.

3. A signal processor comprising:

at least four signal sources each including a photosensor;

plural signal holding means for holding output signals of said signal sources;

signal mixing means for mixing at least two discrete signals among output signals held by said plural signal holding means to produce at least two mixed signals; and discrete signal outputting means for producing respectively the output signals from said plural signal sources, wherein said discrete signal outputting means selects a discrete signal to be outputted from said plural signal sources based on information obtained by said signal mixing means.

4. A signal processor comprising:

at least four signal sources each including a photosensor;

plural signal holding means for holding output signals of said signal sources;

signal mixing means for mixing at least two discrete signals among output signals held by said plural signal holding means to produce at least two mixed signals; and discrete signal outputting means for producing respectively the output signals from said plural signal sources, wherein a predetermined number of signal sources among said plural signal sources output discrete signals based on said mixed signals after said signal mixing means outputs mixed signals from all said plural signal sources.

5. A signal processor comprising:

means for adding signals from plural signal sources to provide a current corresponding to the addition of the signals; and means for outputting a signal having the current provided by the adding means, wherein said adding means comprises a plurality of MOS transistors, each having a gate connected to said plural signal sources via a switching MOS transistor, a source connected to a common power source line, and drains connected in common, and a load resistor having one end connected to the drains connected in common.

6. A signal processor comprising:

means for adding signals from plural signal sources to provide a current corresponding to the addition of the signals; and means for outputting a signal having the current provided by the adding means, wherein said adding means comprises a plurality of bipolar transistors, each having a base connected to one of the plural signal sources via a switching MOS transistor, an emitter connected to a common power source line, and a collector connected in common, and a load resistor having one end connected to the collectors connected in common.

7. A signal processor comprising:

a plurality of signal sources each including a photosensor;

plural signal holding means for holding output signals of said signal sources;

signal mixing means for mixing a plurality of discrete signals among output signals held by said plural signal holding means to produce a plurality of mixed signals; and discrete signal outputting means for producing respectively the output signals from said plurality signal sources, wherein said discrete signal outputting means selects a discrete signal to be outputted from said plural signal sources based on information obtained by said signal mixing means.

8. A signal processor according to claim 7, wherein said photosensor includes a bipolar transistor.

9. A signal processor according to claim 7, wherein said plural signal holding means include a capacitor.

10. A signal processor according to claim 7, further comprising control means for selectively causing said discrete signal outputting means and said signal mixing means to operate.

11. A signal processor according to claim 1, wherein said signal holding means comprises a capacitance element.

12. A signal processor according to claim 1, wherein each of said signal sources comprises a photoelectric capacitance element.

* * * * *

UNITED STATES PATENT AND TRADEMARK OFFICE
CERTIFICATE OF CORRECTION

PATENT NO. : 5,867,045

DATED : February 2, 1999

INVENTOR(S) : ISAMU UENO ET AL.

Page 1 of 2

It is certified that error appears in the above-identified patent and that said Letters Patent is hereby corrected as shown below:

COLUMN 1

Line 39, "time;" should read --time,--.

COLUMN 3

Line 33, "be" should read --to be--.
　　　Line 53, "concrete" should read --concrete embodiments--.

COLUMN 8

Line 61, "calls from the calls" should read --the cells--.

COLUMN 9

Line 39, "id" should read --is--.
　　　Line 40, "the, original" should read --the original--.

COLUMN 10

Line 1, "cat" should read --can--.

COLUMN 11

Line 18, "at,a" should read --at a--.

UNITED STATES PATENT AND TRADEMARK OFFICE
CERTIFICATE OF CORRECTION

PATENT NO. : 5,867,045
DATED : February 2, 1999
INVENTOR(S) : ISAMU UENO ET AL.

Page 2 of 2

It is certified that error appears in the above-identified patent and that said Letters Patent is hereby corrected as shown below:

COLUMN 12

Line 49, "holes-reduces" should read --holes reduces--.

COLUMN 13

Line 30, "operate,at" should read --operate at--.

COLUMN 16

Line 11, "signal" should read --of signal--.
   Line 28, "capacitance" should read --conversion--.

Signed and Sealed this

Twenty-sixth Day of October, 1999

Attest:

Attesting Officer

Q. TODD DICKINSON

Acting Commissioner of Patents and Trademarks